United States Patent Office 3,251,064
Patented May 10, 1966

3,251,064
β - AMINOACYLPHENOXY- AND β - AMINOACYL-PHENYLMERCAPTO-DERIVATIVES OF MONO-CARBOXYLIC ACIDS
Everett M. Schultz, 51 Meade Road, Broad Axe Village, Ambler, Pa., and James M. Sprague, Plymouth Road, Gwynedd Valley, Pa.
No Drawing. Filed Nov. 13, 1962, Ser. No. 237,288
34 Claims. (Cl. 260—294)

This application is a continuation-in-part of U.S. patent application Serial No. 155,961, filed December 6, 1961, and of Serial No. 83,635, now abandoned, filed January 19, 1961, of which said application No. 155,961 also is a continuation-in-part.

This invention is concerned with β-amino-acylphenyl compounds in which said phenyl ring is further linked to an organic carboxylic acid moiety through oxygen or sulfur and in which the said phenyl ring has $n$ further substituents, $n$ being a whole number from zero to four, as well as the salts, esters and amides thereof. More particularly the invention is concerned with salts of α-(aminomethyl)acylphenyl compounds wherein said organic carboxylic acid moiety is selected from an alkanoic acid or an aromatic carboxylic acid having a six-membered ring such as benzoic acid or a phenyl alkanoic acid.

A more specific embodiment of the invention is concerned with β-aminoacylphenoxy- and β-aminoacylphenyl-mercapto derivatives of monocarboxylic acids wherein the monocarboxylic acid portion thereof is derived from an aliphatic-, aliphatic-aromatic-, or an aromatic-monocarboxylic acid. These compounds can be illustrated by the structural formula:

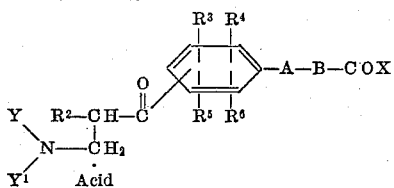

wherein:

$R^2$ is selected from the group consisting of
  hydrogen,
  halogen or halogen-like radicals,
  hydroxyl,
  lower aliphatic, lower aliphatic-oxy or lower aliphatic-thio,
    straight or branched chain,
    saturated or unsaturated, and
    unsubstitued or substituted, the substituent group(s) being
      alkyl,
      amino, particularly a substituted amino,
      halogen-like,
      carboxyl or substituted carboxyl,
      alkyl thio,
      aryl or substituted aryl, especially a mononuclear aryl, e.g. phenyl, halophenyl, lower alkylphenyl, and lower alkoxyphenyl,
      aryl thio
      heterocyclic, especially piperidino, 1-pyrrolidinyl, morpholino and the like,
    alicyclic, either unsubstituted or substituted, the substituent group being, e.g. a lower alkyl group, aryl or aryl-oxy, especially a phenyl or phenoxy
    wherein the aryl-(phenyl) moiety can be unsubstituted or a substituent can be attached, e.g., a lower alkyl, halogen or lower alkoxy substituent;

$R^3$, $R^4$, $R^5$ and $R^6$ respectively can represent the same or different group selected from
  hydrogen,
  halogen or halogen-like,
  lower aliphatic
    straight or branched chain,
  lower aliphatic-oxy or lower aliphatic-thio
    straight or branched chain,
    unsubstituted or having a substituent,
      such as a
        carboxy substituent,
  hydroxy, attached at the 2- or 6- position,
  nitro,
  amino, especially an acylamino as acetylamino,
  aryl, especially phenyl,
    unsubstituted or substituted, e.g. having a halogen or lower alkyl substituent, or wherein
      $R^3$ and $R^4$ and/or
      $R^5$ and $R^6$ can additionally be linked together to form, with the ring carbons to which they are attached, a 5- or 6-membered carbocyclic ring;

A represents
  oxygen or
  sulfur

B represents a divalent
  aliphatic,
  aromatic, preferably
    a phenyl group, or
  aliphatic-aromatic group, preferably
    a phenyl-lower alkyl;

X represents
  hydroxyl,
  alkoxyl,
    unsubstituted or substituted, the substituent(s) being di-aliphatic amino and the like,
  amino,
    such as an amino group of the structure
      —$NR^7R^8$, wherein $R^7$ and $R^8$ are the same or different
        aliphatic, unsubstituted or substituted, group or
        aromatic, unsubstituted or substituted, group, especially substituted phenyl, or
        $R^7$ and $R^8$ can be joined together to form, with the nitrogen atom to which they are attached, a ring containing one or more hetero atoms as morpholino, piperazinyl, 1-pyrrolidinyl, piperidino, and the like,
  hydrazino
    preferably substituted, advantageously a 2,2-di-lower alkyl hydrazino, Y and $Y^1$ respectively can represent the same or different group selected from
  lower alkyl, e.g., methyl and the like, or
  Y and $Y^1$ can be joined together either directly or through a hetero atom, to form with the nitrogen atom to which they are attached a heterocyclic ring such as piperidino, and the like.

In the above definitions and in the claims, the term halogen embraces halogen-like groups and represents chlorine, bromine, iodine, fluorine, halomethyl especially trichloromethyl, trifluoromethyl and the like. Also in the above definitions and in the claims, the term amino should be understood to embrace primary, secondary, tertiary and quaternary amino groups and the like, as well as the usual pharmaceutically acceptable salts thereof.

The β-acylphenoxy- or the β-acylphenylmercapto- compounds or the salts thereof having the structure illustrated above possess diuretic, natriuretic and chloruretic properties and are therefore useful in the treatment of many ailments resulting from an excessive retention of water and/or electrolytes especially sodium, chloride or sodium and chloride ions, as in the treatment of edema and other conditions associated with electrolyte and fluid retention.

The compounds of this invention are prepared by the reaction illustrated below:

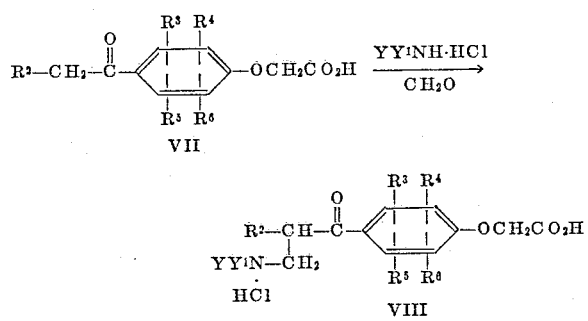

$YY^1NH$ (wherein Y and $Y^1$ have the meaning hereinbefore assigned) in the presence of formaldehyde or paraformaldehyde. The reaction can be carried out either with or without a solvent. Thus, the reactants can be admixed and heated to effect the reaction or the reaction can be carried out in an aqueous medium or in the presence of an organic solvent especially methanol, ethanol or other alcohol. Various salts can be formed by preforming the salts of the amine reactant with the selected acid. Preferred salts are formed with hydrohalides especially the hydrochlorides and hydrobromides.

Compounds of this invention wherein X represents an amide, hydrazide or an alkoxy group can be prepared by known methods by initially converting the product VIII to its acid chloride, and then reacting the acid chloride with the desired amine, hydrazine or alcohol to form the amide, hydrazide or ester derivative of product VIII.

While, for the sake of simplicity, the above reaction scheme illustrates the preparation of p-(β-aminoacyl)-phenoxyacetic acids, it is to be understood that the reaction scheme and the above described reaction can be used to prepare the other position isomers and that it also illustrates a method for preparing other β-aminoacyl-phenyl compounds wherein said phenyl ring is linked to an organic carboxylic acid moiety through oxygen or sulfur, as well as the salts, esters and amides thereof.

PREPARATION OF SATURATED-ACYLPHENOXY-ACETIC ACIDS (VII)

The intermediate saturated-acylphenoxyactic acid (VII) generally can be made by one of two methods from the known phenols (I), as illustrated by the following reaction scheme.

PREPARATION OF SATURATED-ACYLPHENOXYACETIC ACIDS (VII)

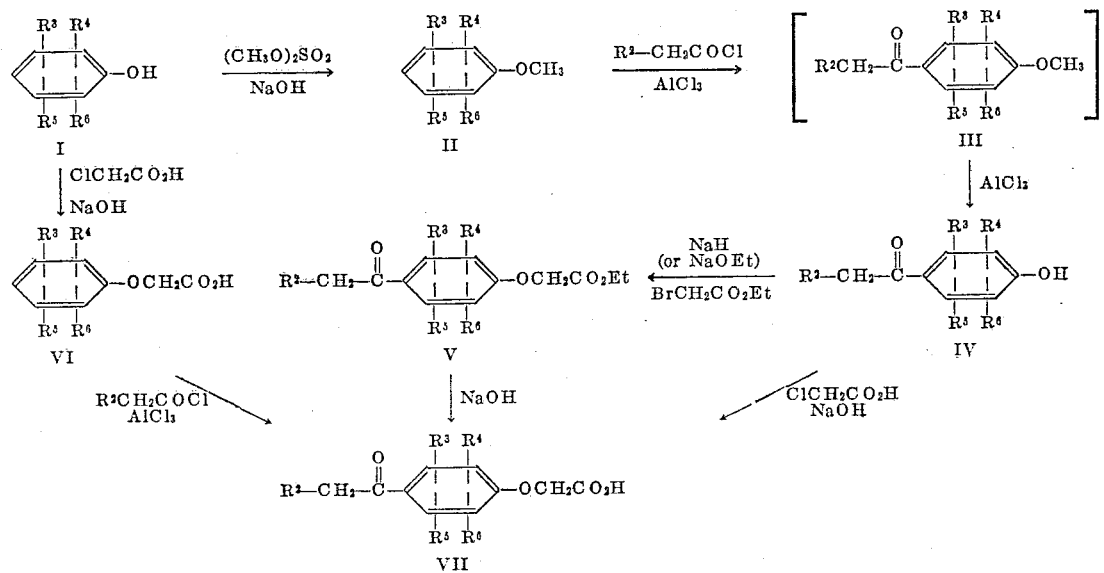

The (β-aminoacyl)phenoxyacetic acid compounds of the invention (VIII) advantageously are prepared by reacting the saturated acyl compound (VII) or its ester with a salt of a secondary amine having the formula One method illustrated above involves heating the phenol (I) with an excess of chloroacetic acid in the presence of at least two moles of an alkali metal hydroxide to form the phenoxyacetic acid (VI).

The phenoxyacetic acids (VI) then are converted to the saturated acylphenoxyacetic acids (VII) by the Friedel-Crafts reaction involving an acyl halide, $$R^2CH_2COCl$$

and Compound VI in the presence of aluminum chloride. The reaction can be carried out either with or without a solvent, such as carbon disulfide. Product VII can be converted to an ester by reaction with an alcohol in the usual manner. As mentioned above, the esters can be converted to the (β-aminoacyl)phenoxyaliphatic acid ester compound.

The above procedure which describes the preparation of acylphenoxyaliphatic acids generally can be adapted to prepare the acylphenylmercaptoaliphatic acids as well.

Although this method has limited applicability, it is the one of choice, where applicable, since it is the most direct route.

A second method although longer, has a broader utility. In this process, the phenol (I) is converted to the corresponding anisole (II) (or phenetole) by known methods, as by reaction with dimethyl sulfate or diethyl sulfate in the presence of a base such as sodium or potassium hydroxide. The anisole (II) (or phenetole) then is reacted with the acyl halide, $R^2$—$CH_2COCl$, in the presence of anhydrous aluminum chloride and a solvent as ligroin or carbon disulfide. The acylanisole (III) (or -phenetole) then is converted to the corresponding acylphenol (IV) by subsequent treatment with additional aluminum chloride in a solvent such as heptane.

The acylphenol (IV) can then be converted to the acylphenoxyacetic acid (VII) by reaction with a haloaliphatic acid (preferably chloroacetic acid) in the presence of sodium or potassium hydroxide.

Alternatively, Compound VII can be prepared from Compound IV by a two step process whereby the acylphenol (IV) is treated with a suspension of sodium hydride in ethylene glycol dimethyl ether (glyme) (or sodium ethoxide in ethanol) followed by reaction with a haloaliphatic acid ester, as ethyl bromoacetate, to form an acylphenoxyacetic acid ester (V). Hydrolysis of the ester V by aqueous or alcoholic base produces Compound VII.

While, for simplicity's sake, the reaction scheme illustrating the preparation of the acylphenoxyacetic acids (VII) shows the preparation of para-acylphenoxyacetic acid compounds, the methods illustrated and described above can be employed to make the other position isomers also. It sometimes is more convenient, however, to prepare the ortho isomers by the Fries Rearrangement illustrated below. The R's in the following structures are attached to the phenyl nucleus so as to leave one of the ortho positions unsubstituted.

PREPARATION OF O-ACYLPHENOXYACETIC ACIDS (VIIa)

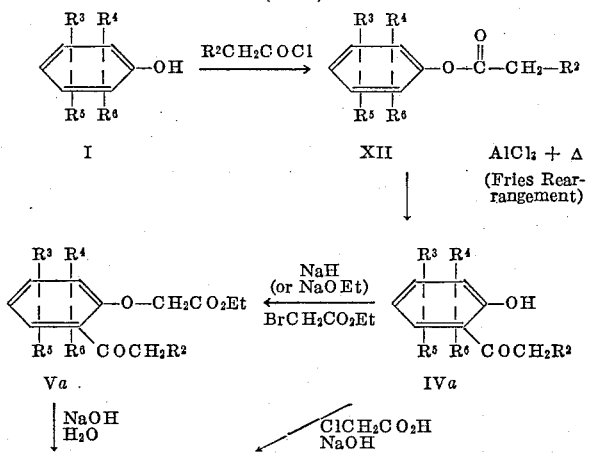

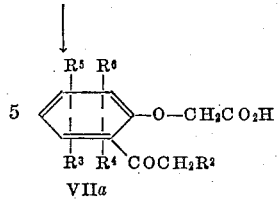

According to the Fries Rearrangement procedure illustrated above, the phenol (I) initially is esterified by reaction with the acyl halide, $R^2$—$CH_2COCl$, to form the corresponding phenolic ester (XII) which is rearranged to the ortho-acylphenol (IVa), upon heating with aluminum chloride. The conversion of the ortho-acylphenol (IVa) to the desired ortho-acylphenoxyacetic acid (VIIa) by either (a) Treatment with chloroacetic acid in presence of base or (b) Reaction of IVa with sodium hydride or sodium alkoxide followed by reaction with a haloacetic acid ester to form Va which is hydrolyzed to VIIa follows substantially the same procedures described above for converting IV to VII or for converting IV to V to VII. While the Fries Rearrangement is especially useful for preparing the ortho-isomers, it can be used to prepare para-isomers also.

While the above discussion outlines general methods suitable for the preparation of the novel compounds of this invention, it is to be understood that the methods described above as well as those described in the following examples are illustrative of those methods which can be employed and are not to be construed as limiting the invention to the particular methods or the particular compounds specifically described.

The following examples illustrate various methods by which the acylphenol starting substances can be prepared. The complete examples taken in conjunction with Table I describe the preparation and provide the physical constants of all acylphenols used in the synthesis of the novel compounds of this invention that were not described in the available literature.

Example 1 illustrates the preparation of an acylphenol (IV) from an anisole (II).

*Example 1.—2',3'-dichloro-4'-hydroxy-1-cyclopentaneacetophenone*

To a mixture of 2,3-dichloroanisole (38.8 g., 0.213 mole) and cyclopentaneacetyl chloride (25 g., 0.17 mole) in carbon disulfide (250 ml.), there is added, with stirring, aluminum chloride (46.6 g., 0.35 mole). The mixture then is heated at 50–60° C. for 5 hours. The carbon disulfide then is removed by distillation, heptane (200 ml.) and aluminum chloride (26.67 g., 0.2 mole) is added and the mixture stirred and heated on the steam bath for 2 hours. The solvent then is decanted and ice water (400 ml.) is added slowly with external cooling in an ice bath. This is followed by addition of concentrated hydrochloric acid (40 ml.), and extraction with ether. The ether extract is washed with water and the ether then evaporated. The residue is added to 10% sodium hydroxide solution (160 ml.) and the mixture heated on a steam bath for 3 hours to saponify any ester that may have been formed. After acidification with hydrochloric acid, 2',3'-dichloro-4'-hydroxy-1-cyclopentaneacetophenone is obtained, M.P. 86–88° C., 28 g. yield. After recrystallization from a mixture of isopropyl alcohol and water and an additional recrystallization from cyclohexane, the product melts at 87–88° C.

*Analysis.*—Calculated for $C_{13}H_{14}Cl_2O_2$: C, 57.16; H, 5.17; Cl, 25.96. Found: C, 57.77; H, 5.10; Cl, 25.80.

Example 2 illustrates a method by which the phenolic esters (XII), used in the Fries Rearrangement can be prepared from a phenol, I.

Example 2.—3-chlorophenyl propionate 3-chlorophenol (1.1 mole) is added gradually to propionyl chloride (101.5 g., 1.1 mole) and the mixture then heated on the steam bath for one hour and distilled to give 3-chlorophenyl propionate, B.P. 122.5° C. at 16 mm. pressure, $N_D^{25}$ 1.5105.

*Analysis.*—Calculated for $C_9H_9ClO_2$: C, 58.55; H, 4.91; Cl, 19.20. Found: C, 58.79; H, 5.00; Cl, 19.26.

The following Examples 3–5 illustrate the Fries Rearrangement of Compound XII to Compound IVa; the process of Example 3 being carried out at 140° C. and that of Examples 4 and 5 being carried out at between 90–100° C.

Example 3.—2-propionyl-5-chlorophenol 3-chlorophenyl propionate, from Example 2 (147 g., 0.8 mole), is placed in a 1-liter round flask and anhydrous aluminum chloride (128 g., 0.96 mole) is added slowly with stirring and cooling at 30–40° C. The flask then is plunged into a metal bath at 140° C. and kept at this temperature for 20 minutes. The flask then is cooled slowly while rotating slowly. Benzene (150 ml.) then is added and the aluminum complex is decomposed by the careful addition of 3 N hydrochloric acid with cooling. The benzene is separated and washed with 3 N hydrochloric acid and with water and the benzene then evaporated and the residue taken up in ether and extracted with 500 ml. of 5% sodium hydroxide in several portions. The aqueous extract is acidified with 12 N hydrochloric acid, and the oil that separates is extracted with ether and the ether solution dried over sodium sulfate. The ether then is evaporated and the residue distilled to give 2-propionyl-5-chlorophenol, B.P. 130–140° C. at 60 mm. pressure, M.P. 45–47° C., yield 78.5 g.

*Analysis.*—Calculated for $C_9H_9ClO_2$: C, 58.55; H, 4.91; Cl, 19.21. Found: C, 58.50; H, 5.12; Cl, 19.08.

Example 4.—2-butyryl-3,5-dimethylphenol

To a solution of 0.15 mole of 3,5-dimethylphenol in 60 ml. of pyridine is added during 15 minutes 0.18 mole of butyryl chloride with ice bath cooling. The mixture is permitted to stand 1 hour at room temperature, then diluted with 300 ml. of water to give an oily product which is taken up in ether. The ether solution is washed thoroughly with dilute acid and water, dried, and the ether evaporated to leave the butyric acid ester of 3,5-dimethylphenol. The ether is mixed with 0.29 mole of aluminum chloride and then heated 1.6 hours on the steam bath. The reaction mixture is poured onto ice and the solid product obtained is recrystallized from cyclohexane to give 2-butyryl-3,5-dimethylphenol, M.P. 57–58.5° C.

*Analysis.*—Calculated for $C_{12}H_{16}O_2$: C, 74.97; H, 8.39. Found: C, 74.63; H, 8.35.

Example 5.—2-butyryl-3,5-dichlorophenol

This product is prepared following substantially the same procedure described in Example 4 employing 24.4 g. (0.15 mole) of 3,5-dichlorophenol and 19.3 g. (0.18 mole) of butyryl chloride. This procedure gives 33.2 g. of the liquid butyric acid ester of 3,5-dichlorophenol and 21.5 g. of 2-butyryl-3,5-dichlorophenol which after recrystallization from ligroin melts at 45–48° C. A further recrystallization from the same solvent gives the product with a M.P. of 47–48.5° C.

*Analysis.*—Calculated for $C_{10}H_{10}Cl_2O_2$: C, 51.52; H, 4.32. Found: C, 52.37; H, 4.35.

Examples 6–9 describe other methods, not illustrated in the above reaction schemes, which can be used to prepare acylphenols.

Examples 6 and 7 specifically illustrate the conversion of benzaldehyde to form an acylphenol.

Example 6.—2′,6′-dichloro-3′-hydroxybutyrophenone

*Step A: Preparation of 2,6-dichloro-3-methoxy-α-propylbenzyl alcohol.*—2,6-dichloro-3-methoxybenzaldehyde (109 g., 0.53 mole) is added during 0.5 hour to a solution of propylmagnesium bromide in 600 ml. of ether prepared from 72.4 g. (0.59 mole) of propyl bromide and 14.4 g. (0.59 mole) of magnesium. The mixture is refluxed 1.5 hours and then poured into ice-cold dilute hydrochloric acid. The ether layer is separated, washed with water and dried over sodium sulfate. Evaporation of the ether gives 126 g. of 2,6-dichloro-3-methoxy-α-propylbenzyl alcohol as a yellowish oil.

*Step B: Preparation of 2′,6′-dichloro-3′-methoxybutyrophenone.*—A solution of 126 g. (0.51 mole) of 2,6-dichloro-3-methoxy-α-propylbenzyl alcohol, and 98.5 g. (0.33 mole) of sodium dichromate dihydrate in 150 ml. of water and 400 ml. of acetic acid is heated 1 hour on the steam bath. The solution is diluted with 2.5 liters of water to produce an oily product which is taken up in ether, the ether solution washed with water, and sodium bicarbonate solution, and then dried over sodium sulfate. Evaporation of the ether gives 119 g. of 2′,6′-dichloro-3′-methoxybutyrophenone as a yellow oil.

*Step C: Preparation of 2′,6′-dichloro-3′-hydroxybutyrophenone.*—A mixture of 119 g. (0.48 mole) of 2′,6′-dichloro-3′-methoxybutyrophenone and 191 g. (1.44 mole) of aluminum chloride in 600 ml. of heptane is stirred and heated 2.5 hours on the steam bath. The heptane then is decanted from the viscous precipitate which is hydrolyzed by the addition of ice and dilute hydrochloric acid. The oily product obtained is taken up in ether and purified by distillation yielding 76.5 g. of 2′,6′-dichloro-3′-hydroxybutyrophenone, B.P. 148–150°/1.5 mm., $N_D^{28}$ 1.5558.

*Analysis.*—Calculated for $C_{10}H_{10}Cl_2O_2$: C, 51.52; H, 4.32. Found: C, 51.67; H, 4.57.

Example 7.—2′-chloro-3′-hydroxybutyrophenone

*Step A: Preparation of 2-chloro-3-methoxy-α-propylbenzyl alcohol.*—By following substantially the same procedure described in Step A, Example 6, but replacing the 2,6-dichloro-3-methoxybenzaldehyde by an equimolecular quantity of 2-chloro-3-methoxybenzaldehyde, and following substantially the same procedure described in Step A of Example 6, there is obtained a 97% yield of 2-chloro-3-methoxy-α-propylbenzyl alcohol.

*Step B: Preparation of 2′-chloro-3′-methoxybutyrophenone.*—By following substantially the same procedure described in Step B of Example 6 but replacing the 2,6-dichloro-3-methoxy-β-propylbenzyl alcohol by an equimolecular quantity of 2-chloro-3-methoxy-α-propylbenzyl alcohol, and following substantially the same procedure described in Step B of Example 6 there is obtained 2′-chloro-3′-methoxybutyrophenone, B.P. 174–180° C. at 22 mm. pressure $N_D^{28}$ 1.5375.

*Step C: Preparation of 2′-chloro-3′-hydroxybutyrophenone.*—By replacing the 2′,6′-dichloro-3′-methoxybutyrophenone employed in Step C of Example 6 by an equimolecular quantity of 2′-chloro-3′-methoxybutyrophenone and following substantially the same procedure described in Step C of Example 6 there is obtained 2′-chloro-3′-hydroxybutyrophenone, B.P. 110–120° C. at 0.3 mm. pressure, yield 88%.

*Analysis.*—Calculated for $C_{10}H_{11}ClO_2$: C, 60.46; H, 5.58. Found: C, 59.90; H, 5.54.

Example 8 illustrates a method by which a phenyl Grignard can be converted to an acylphenol.

Example 8.—2-(2-methylenebutyryl)-3-methylphenoxyacetic acid

*Step A: Preparation of 2′-methoxy-6′-methylbutyrophenone.*—To a solution of 2-methoxy-6-methylphenyl magnesium bromide [prepared from 2-bromo-3-methylanisole (16.5 g., 0.082 mole) and magnesium (2.1 g., 0.086 mole)] in 40 ml. of ether is added a solution of butyronitrile (5.9 g., 0.085 mole) in ether (10 ml.) and the mixture refluxed for 2¼ hours. The reaction product then is poured into a mixture of ice and hydrochloric acid which then is heated 18 hours on the steam bath. The oil that separates is taken up in ether, the ether solution dried and the ether then evaporated to give an 8.4 g. yield of 2'-methoxy-6'-methylbutyrophenone.

*Step B: Preparation of 2'-hydroxy-6'-methylbutyrophenone.*—A mixture of 2'-methoxy-6'-methylbutyrophenone (8.4 g., 0.044 mole), aluminum chloride (17.3 g., 0.13 mole) and 60 ml. of heptane is heated 2¼ hours on the steam bath. The heptane then is decanted and the residue hydrolyzed with ice-water. The oil that separates is distilled, yielding 6.2 g. of 2'-hydroxy-6'-methylbutyrophenone, B.P. 155–158° C. at 20 mm. pressure.

*Analysis.*—Calculated for $H_{11}H_{14}O_2$: C, 74.13; H, 7.92. Found: C, 73.89; H, 7.62.

Example 9 describes a method whereby an aromatic acyl amine can be converted to an acylphenol by diazotization folowed by hydrolysis.

*Example 9.—2,4-dimethyl-5-butyrylphenol*

2,4-dimethyl-5-aminobutyrophenone (119.5 g., 0.63 mole) in a solution of 190 ml. of sulfuric acid in 945 ml. of water is diazotized at 5° C. with 46 g. (0.67 mole) of sodium nitrite. The solution of diazonium salt is heated on the steam bath for 30 minutes. The phenol separates as an oil which crystallizes when the mixture is cooled. The product is taken up in ether, extracted into 5% sodium hydroxide solution and reprecipitated by acidification. After recrystallization from ethanol there is obtained 76.5 g. of 2,4-dimethyl-5-butyrylphenol, M.P. 95–100° C. Further recrystallization from the same solvent gives the product melting at 100.5–102.0° C.

*Analysis.*—Calculated for $C_{12}H_{16}O_2$: C, 74.97; H, 8.39. Found: C, 74.41; H, 8.29.

Other acylphenol (IV) starting materials used in the preparation of the novel compounds of this invention are identified in Table I. Each of the compounds was made by replacing the 2,3-dichloro-anisole employed in Example 1 by an equimolecular quantity of the anisole or phenetole

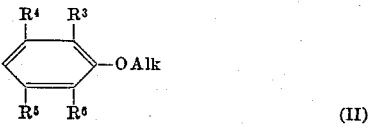
(II)

identified in Table I and by replacing the cyclopentaneacetyl chloride employed in Example I by an equimolecular quantity of the acylchloride, $R^2CH_2COCl$, which also is identified in Table I. The reaction is carried out in substantially the same manner as described in Example I to give the acylphenol,

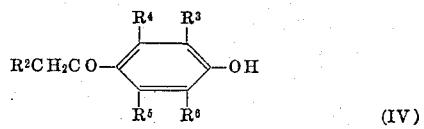
(IV)

which also is identified in the table by structure, melting or boiling point and by elemental analysis for those products which were purified.

TABLE I

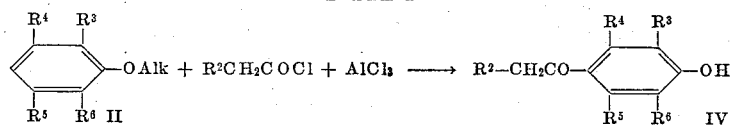 + $R^2CH_2COCl$ + $AlCl_3$ ⟶ 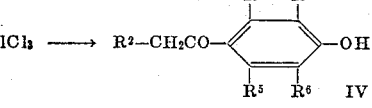

| Ex. No. | R³ | R⁴ | R⁵ | R⁶ | Alk | R² | Yield, percent | M.P. (B.P.¹), °C. | Empirical | C | H | Cl |
|---|---|---|---|---|---|---|---|---|---|---|---|---|
| 10 | H | Cl | H | H | CH₃ | CH₃CH₂ | | 82.5–84 | $C_{10}H_{11}ClO_2$: Calc. / Found | 60.46 / 60.15 | 5.58 / 5.66 | 17.85 / 17.77 |
| 11 | H | Cl | Cl | H | CH₃ | CH₃CH₂ | 10 | 75.5–76.5 | $C_{10}H_{10}Cl_2O_2$: Calc. / Found | 51.53 / 51.73 | 4.32 / 4.49 | 30.42 / 30.15 |
| 12 | Br | Cl | H | H | CH₃ | CH₃CH₂ | 77 | 107–108.5 | $C_{10}H_{10}BrClO_2$: Calc. / Found | 43.27 / 43.79 | 3.63 / 3.91 | |
| 13 | NO₂ | CH₃ | H | H | CH₃ | CH₃CH₂ | 16.5 | 133–134 | $C_{11}H_{13}NO_4$: Calc. / Found | 59.18 / 59.54 | 5.87 / 6.01 | N, 6.28 / N, 6.63 |
| 14 | H | CH₃CONH— | H | H | CH₃ | CH₃CH₂ | 61 | 94–96 | $C_{12}H_{15}NO_3$: Calc. / Found | 65.14 / 64.84 | 6.83 / 6.64 | N, 6.33 / N, 6.36 |
| 15 | H | Cl | H | H | CH₃CH₂— | (CH₃)₃C— | 27.5 | 97–98 | $C_{12}H_{15}ClO_2$: Calc. / Found | 63.53 / 63.42 | 6.67 / 6.69 | 15.64 / 15.38 |
| 16 | Cl | Cl | H | H | CH₃ | (CH₃)₂CH— | 82 | 112–114 | $C_{11}H_{12}Cl_2O_2$: Calc. / Found | 53.46 / 53.57 | 4.89 / 4.94 | 28.69 / 28.51 |
| 17 | Cl | Cl | H | H | CH₃ | (CH₃)₂CHCH₂— | 84 | 86–87 | $C_{12}H_{14}Cl_2O_2$: Calc. / Found | 55.19 / 55.08 | 5.40 / 5.42 | 27.15 / 26.93 |
| 18 | Cl | Cl | H | H | CH₃ | cyclohexyl–H | 76 | 130–132 | Calc. / Found | | | Not purified |
| 19 | H | Cl | H | H | CH₃ | phenyl | | (ᵃ) | Calc. / Found | | | |

ᵃ 170–204/0.3 mm.

The following examples describe the preparation, from a phenol (I) or a thiophenol, of phenoxyacetic acids (VI) and phenylmercaptoalkanoic acids which also are useful starting materials for preparing the novel compounds of this invention.

*Example 20.—2,3,5,6-tetramethylphenoxyacetic acid*

A 500 ml., 4-necked, round bottomed flask fitted with stirrer, condenser and two dropping funnels is charged with 40.0 g. of 2,3,5,6-tetramethylphenol and 21.5 g. of sodium hydroxide in 90 ml. of water. The solution is heated at 85–95° C. on a steam bath while 34.5 g. of chloroacetic acid in 35 ml. of water is slowly added. Heating is continued one-half hour and sodium hydroxide (21.5 g.) and chloroacetic acid (34.5 g.) are added to the reaction mixture. Heating is continued for an additional 40 minutes, the solution filtered, acidified with concentrated hydrochloric acid and cooled whereupon a solid product, 45 g. (82%) is formed. After recrystallization from 600 ml. of heptane, purified 2,3,5,6-tetramethylphenoxyacetic acid is obtained, M.P. 117–118° C.

*Analysis.*—Calculated for $C_{12}H_{16}O_3$: C, 69.21; H, 7.74. Found: C, 69.05; H, 7.67.

*Example 21.—3-(3-chlorophenylmercapto)-propionic acid*

A solution of 14.5 g. (0.10 mole) of m-chlorothiophenol in 125 ml. of 5% sodium hydroxide solution is mixed with a solution of 15.9 g. (0.10 mole) of β-bromopropionic acid in 150 ml. of saturated sodium bicarbonate solution. After 4 hours the solution is acidified and the precipitated product recrystallized from aqueous ethanol to give 19.6 g. of 3-(3-chlorophenylmercapto)-propionic acid, M.P. 79.5–81.5° C.

*Analysis.*—Calculated for $C_9H_9ClO_2S$: C, 49.88; H, 4.19. Found: C, 50.53; H, 4.23.

The following examples illustrate various methods by which the saturated-acylphenoxyacetic acid (VII) intermediates (employed in the preparation of the novel compounds of this invention) can be prepared. The complete examples taken in conjunction with Tables II to VI describe the preparation and provide the physical constants of all saturated-acylphenoxyalkanoic acids and saturated-acylphenylmercapto-alkanoic acids employed in the synthesis of the novel compounds described herein, which products (VII) had not been described in the available literature.

Example 22 illustrates the use of the Friedel-Crafts reaction in the preparation of saturated acylphenoxyacetic acids (VII) from a phenoxyacetic acid (VI).

*Example 22.—3-chloro-4-propionylphenoxyacetic acid*

Powdered aluminum chloride (216 g., 1.625 mole) and carbon disulfide (400 ml.) are placed in a 1-liter, 4-necked flask equipped with a stirrer, dropping funnel, reflux condenser and internal thermometer. 3-chlorophenoxyacetic acid (93.29 g., 0.5 mole) is added in portions with stirring and then propionyl chloride (57.8 g., 0.625 mole) is added dropwise with stirring over a period of 0.5 hour at a temperature of about 22–26° C. After stirring 1 hour at room temperature, the reaction flask is placed in a water bath and the temperature maintained at 50° C. for 3 hours. The carbon disulfide then is decanted and the aluminum complex remaining is added to a mixture of 1 kg. of ice and 125 ml. of concentrated hydrochloric acid. The solid that separates is dried in air and then dried further by azeotropic distillation with benzene and then crystallized from benzene to give 77.5 g. (32%) of 3-chloro-4-propionylphenoxyacetic acid, M.P. 107.5–109° C.

*Analysis.*—Calculated for $C_{11}H_{11}ClO_4$: C, 54.44; H, 4.57; Cl, 14.61. Found: C, 54.88; H, 4.46; Cl, 14.36.

Example 23 describes an alternate method whereby the saturated-acylphenoxyacetic acids (VII) are prepared by the reaction of an acylphenol (IV) with an α-bromoester in glyme in the presence of sodium hydride to form an ester of an acylphenoxyacetic acid (V) which then is hydrolyzed to form the acylphenoxyacetic acid (VII).

*Example 23.—3-propionylphenoxyacetic acid*

A solution of 0.1 mole of 3-propionylphenol in 60 ml. of ethylene glycol dimethyl ether (glyme) is added to a suspension of 0.1 mole of sodium hydride in 40 ml. of the same solvent. Then 0.11 mole of ethyl bromoacetate is added during 25 minutes. The mixture is refluxed 1 hour and the precipitated sodium bromide is filtered off and solvent distilled in vacuo. To the residue is added 80 ml. of 10% sodium hydroxide solution and the mixture heated on the steam bath for 10 minutes until a clear solution is formed. The solution is acidified to precipitate the product which soon crystallizes. Recrystallization from a mixture of benzene and cyclohexane gives 3-propionylphenoxyacetic acid, M.P. 72–78° C.

The procedure described in Example 24 illustrates a method whereby the saturated acylphenoxyacetic acids (VII) are prepared by the reaction of an acylphenol (IV) with an α-bromoester in an alcohol and in the presence of sodium alkoxide to form an ester of an acylphenoxyacetic acid (V) which then is hydrolyzed to the corresponding phenoxyacetic acid (VII).

*Example 24.—2-(4-butyryl-3-chlorophenoxy) butyric acid*

Sodium (4.8 g., 0.21 g. atom) is dissolved in 150 ml. of absolute alcohol to form a solution of sodium ethoxide. 2′-chloro-4′-hydroxybutyrophenone, obtained as described in Example 10 (39.73 g., 0.20 mole) is added, the solution heated to boiling and ethyl α-bromobutyrate (39.01 g., 0.20 mole) added dropwise with stirring during 0.5 hour. The mixture is stirred and refluxed for 4.5 hours and the solvents then distilled on a steam bath. To the residue sodium hydroxide (16 g., 0.4 mole) in water (150 ml.) is added and the mixture heated with stirring for 2.25 hours. The reaction mixture then is cooled and extracted with ether and acidified with hydrochloric acid. The oil that separates is extracted with ether, the solution dried over anhydrous sodium sulfate and the ether evaporated to give a residue which distills at between 173–197° C. at 0.2 mm. pressure to give 46.5 g. (81%) of 2-(4-butyryl-3-chlorophenoxy)butyric acid.

*Analysis.*—Calculated for $C_{14}H_{17}ClO_4$: C, 59.05; H, 6.02; Cl, 12.46. Found: C, 59.22; H, 6.23; Cl, 12.24.

Example 25 illustrates still another method for making the saturated acylphenoxyacetic acids (VII) wherein an acylphenol (IV) reacts with an α-haloacid in water in the presence of sodium hydroxide to form an acylphenoxyacetic acid (VII) directly.

*Example 25.—2,6-dichloro-4-butyrylphenoxyacetic acid*

3′,5′-dichloro-4′-hydroxybutyrophenone [prepared by the Fries Rearrangement of 2,6-dichlorophenylbutyrate] (51.5 g., 0.221 mole) in water (250 ml.) is combined with a solution of sodium hydroxide (17.68 g., 0.442 mole) in 35 ml. of water. To the resulting solution at 55° C. is added a solution of chloroacetic acid (20.88 g., 0.221 mole) in 21 ml. of water over a period of 30 minutes at temperature of 55–57° C. with stirring. The temperature is raised to 100° C. and the reaction solution treated simultaneously with a solution of chloroacetic acid (104.40 g., 1.105 mole) in 105 ml. of water and a solution of sodium hydroxide (88.40 g., 2.21 mole) in 180 ml. of water (keeping the reaction solution slightly basic during the entire period) over a period of 10 hours with stirring. The boiling solution is acidified with concentrated hydrochloric acid. The solid that separates after chilling in an ice bath to room temperature is collected, crystallized two times from a mixture of benzene and cyclohexane and then from benzene alone to give 25.4 g. (40%) of 2,6-dichloro-4-butyrylphenoxyacetic acid, M.P. 136–137° C. (corr.).

*Analysis.*—Calculated for $C_{12}H_{12}O_4Cl_2$: C, 49.51; H, 4.15; Cl, 24.36. Found: C, 49.95; H, 4.23; Cl, 24.08.

The reaction illustrated by Example 25 also can be used to prepare the intermediate phenylacetic acid which subsequently can be acylated by the method described in Example 22, for example, to give the saturated acylphenoxyacetic acid (VII). The preparation of the intermediate phenylacetic acid is described in the following example.

Example 26.—2-chloro-3-methylphenoxyacetic acid

The above product is prepared following substantially the same procedure described in Example 25 using the following substances:

2-chloro-3-methylphenol _____ 28.7 g., 0.20 mole.
Chloroacetic acid _____ 38 g., 0.40 mole.
Sodium hydroxide _____ 32 g., 0.80 mole.

Acidification of the basic reaction mixture yields 28.5 g. (71%) of 2-chloro-3-methylphenoxyacetic acid melting at 184–185° C.

*Analysis.*—Calculated for $C_9H_9ClO_3$: C, 53.88; H, 4.52; Cl, 17.67. Found: C, 54.22; H, 4.39; Cl, 17.15.

The preparation of the acylated product is described in Table II as Example 64.

The following examples described the preparation of other saturated acylphenoxyacetic acids (VII) by a variety of methods not necessarily included in the above reaction schemes.

Example 27.—3-methoxy-4-butyrylphenoxyacetic acid

*Step A: Preparation of 3-hydroxy-4-butyrylphenoxyacetic acid.*—The above product was obtained following substantially the same procedure described in Example 22 using the following substances:

m-Methoxyphenoxyacetic acid __ 80.6 g., 0.4424 mole.
Carbon disulfide _____ 500 ml.
Butyryl chloride _____ 58.71 g., 0.551 mole.
Powdered aluminum chloride __ 191.08 g., 1.433 mole.

The above procedure yields 15.6 g. (15%) of a yellow waxy solid boiling at 197–199° C. at 0.1 mm. pressure. Redistillation gives material boiling at 203–204° C. at 0.10 mm. pressure. Further recrystallization from a mixture of benzene and cyclohexane gives 3-hydroxy-4-butyrylphenoxyacetic acid in the form of a white crystalline solid, M.P. 120–121° C.

*Step B: Preparation of 3-methoxy-4-butyrylphenoxyacetic acid.*—To a solution of 3-hydroxy-4-butyrylphenoxyacetic acid (10.9 g., 0.0458 mole) dissolved in 100 ml. of water containing sodium hydroxide (4.0 g., 0.1 mole) is added methyl sulfate (5.78 g., 0.0458 mole) over a period of 15 minutes at a temperature of 25–28° C. with stirring. The temperature is raised to 50° C. and the reaction solution treated simultaneously with methyl sulfate (8.67 g., 0.0687 mole) and a solution of sodium hydroxide (6.0 g., 0.15 mole) in 35 ml. of water over a period of 45 minutes at a temperature of 50–60° C. The reaction solution then is heated under reflux with stirring for an additional two hours. The boiling reaction solution is acidified with concentrated hydrochloric acid and the oil that forms solidifies after cooling to room temperature. There is thus obtained 3-methoxy-4-butyrylphenoxyacetic acid, M.P. 118–132° C., yield 11 g. (95%). After four recrystallizations from benzene the product is obtained in the form of white needles, M.P. 137–138° C. (corr.).

*Analysis.*—Calculated for $C_{13}H_{16}O_5$: C, 61.89; H, 6.39. Found: C, 61.47; H, 6.42.

Example 28.—3-propionyl-4-chlorophenoxyacetic acid

*Step A: Preparation of 2-chloro-5-nitropropiophenone.*—2-chloropropiophenone (84.5 g., 0.5 mole) is added to 300 ml. of fuming nitric acid (density 1.5) at a temperature of 5–10° C. during 18 minutes. The mixture is allowed to stand at 0–5° C. for 30 minutes and then poured into ice water. The solid product is recrystallized from isopropyl alcohol to give 75 g. of 2-chloro-5-nitropropiophenone, M.P. 52–56° C. After recrystallization from isopropyl alcohol, the product has a melting point of 54–56° C.

*Analysis.*—Calculated for $C_9H_8ClNO_3$: C, 50.60; H, 3.77; N, 6.56. Found: C, 51.47; H, 4.01; N, 6.62.

*Step B: Preparation of 2-chloro-5-aminopropiophenone.*—A solution of 25.9 g. (0.121 mole) of 2-chloro-5-nitropropiophenone in 60 ml. of acetic acid is added to 240 ml. of a 7.5 N hydrochloric acid solution in which is dissolved 100 g. of stannous chloride dihydrate. The solution is heated 1 hour on the steam bath and then made basic by addition of sodium hydroxide solution. The oily product is taken up in ether, the ether then evaporated to give a yellow oil weighing 18 g. Upon distillation the product has a boiling point of 143–146° C. at 0.5 mm. pressure.

*Analysis.*—Calculated for $C_9H_{10}ClNO$: C, 58.86; H, 5.49; N, 7.63. Found: C, 59.10; H, 5.58; N, 7.54.

*Step C: Preparation of 3-propionyl-4-chlorophenol.*—2-chloro-5-aminopropiophenone (48.5 g., 0.26 mole) is dissolved in 192 ml. of water and 26 ml. of concentrated sulfuric acid and diazotized with a solution of 17.9 g. (0.26 mole) of sodium nitrite in 40 ml. of water. The diazonium mixture is added dropwise during 30 minutes to a stirred mixture of 340 ml. of 1 N sulfuric acid containing 48 g. of cupric sulfate pentahydrate and 250 ml. of toluene. The toluene layer then is separated and extracted with a 5% solution of sodium hydroxide. Acidification precipitates an oily product which is purified by distillation to give 13.0 g. of 3-propionyl-4-chlorophenol, B.P. 135–140° C. at 0.5 mm. pressure.

*Step D: Preparation of 3-propionyl-4-chlorophenoxyacetic acid.*—3-propionyl-4-chlorophenol is alkylated with ethylbromoacetate by substantially the same procedure described in Example 23 to give 3-propionyl-4-chlorophenoxyacetic acid, M.P. 77.5–80.5° C.

Example 29.—3-(2,4-dimethyl-5-butyrylphenoxy)-propionic acid 2,4-dimethyl-5-butyrylphenol (46 g., 0.24 mole) is dissolved in 250 ml. of 10% sodium hydroxide solution. The solution is heated to boiling and 180 g. (2.4 mole) of β-propiolactone is added dropwise at such a rate to keep the solution boiling. During the addition a 10% sodium hydroxide solution is added in portions to keep the mixture constantly alkaline. The solution is cooled and acidified to give a precipitate which is taken up in ether and the product extracted into sodium bicarbonate solution. Acidification of this solution precipitates the desired product which after recrystallization from aqueous ethanol gives 24.5 g. of 3-(2,4-dimethyl-5-butyrylphenoxy)-propionic acid, M.P. 97.5–99.0° C.

*Analysis.*—Calculated for $C_{15}H_{20}O_4$: C, 68.16; H, 7.63. Found: C, 68.33; H, 7.63.

Example 30.—3-chloro-4-acetylphenoxyacetic acid

The above product is obtained by following substantially the same method described in Example 22 using the ingredients listed below:

3-chlorophenoxyacetic acid _____ 17.06 g., 0.1 mole.
Acetyl chloride _____ 7.85 g., 0.125 mole.
Powdered aluminum chloride ____ 43.5 g., 0.325 mole.
Carbon disulfide _____ 150 ml.

The product obtained is reprecipitated from a sodium bicarbonate solution by acidification from hydrochloric acid to give a white solid which, when crystallized from benzene, gives 4.94 g. of 3-chloro-4-acetylphenoxyacetic acid, M.P. 107–109° C.

*Analysis.*—Calculated for $C_{10}H_9ClO_4$: C, 52.53; H, 3.97; Cl, 15.51. Found: C, 52.29; H, 4.35; Cl, 15.24.

*Example 31.—3-chloro-4-(3-phenylpropionyl)phenoxyacetic acid*

*Step A: Preparation of 3-chloro-4-(3-phenylacryloyl)-phenoxyacetic acid.*—3-chloro-4-acetylphenoxyacetic acid prepared as described in Example 30 (4.4 g., 0.0193 mole) and benzaldehyde (2.1 g., 0.0193 mole) is dissolved in a mixture of sodium hydroxide (1.8 g., 0.045 mole) in 160 ml. of water and 10 ml. of ethanol. The solution is kept at 25–30° C. for 16 hours, acidified and the solid that separates is collected, dried at 65° C. and crystallized from benzene to give 1.2 g. of 3-chloro-4-(3-phenylacryloyl)-phenoxyacetic acid, M.P. 139–140° C.

*Analysis.*—Calculated for $C_{17}H_{13}ClO_4$: C, 64.47; H, 4.13; Cl, 11.19. Found: C, 64.09; H, 3.99; Cl, 10.97.

*Step B: Preparation of 3-chloro-4-(3-phenylpropionyl)-phenoxyacetic acid.*—3-chloro-4-(3 - phenylacryloyl)phenoxyacetic acid (24.2 g., 0.076 mole) is dissolved in isopropanol (275 ml.) and hydrogenated in the presence of 5% palladium on charcoal at 26° C. and 756 mm. pressure. When the required amount of hydrogen is absorbed, the solution is warmed and filtered to remove the catalyst and the alcohol then removed by evaporation. The product obtained is crystallized from benzene to give 14.4 g. (59.3%) of 3-chloro-4-(3-phenylpropionyl)phenoxyacetic acid, M.P. 113–115° C.

*Analysis.*—Calculated for $C_{17}H_{15}ClO_4$: C, 64.04; H, 4.74; Cl, 11.13. Found: C, 64.28; H, 4.82; Cl, 11.11.

*Example 31–A.—3-chloro-4-[3-(4 - chlorophenyl)propionyl]phenoxyacetic acid*

*Step A: Preparation of 3-chloro-4-[3-(4-chlorophenyl)-acryloyl]phenoxyacetic acid.*—The above compound is prepared following essentially the method described in Example 31, Step A, using an equimolar amount of 4-chlorobenzaldehyde in place of the benzaldehyde used in that example to give 3-chloro-4-[3-(4-chlorophenyl)-acryloyl]phenoxyacetic acid.

*Step B: Preparation of 3-chloro-4-[3-(4-chlorophenyl)-propionyl]phenoxyacetic acid.*—The compound obtained in Step A is converted to 3-chloro-4-[3-(4-chlorophenyl)-propionyl]phenoxyacetic acid by following essentially the same process described in Example 31, Step B.

*Example 31–B.—3-chloro-4-[3-(4-propylphenyl)propionyl]phenoxyacetic acid*

*Step A: Preparation of 3-chloro-4-[3-(4-propylphenyl)-acryloyl]phenoxyacetic acid.*—The above compound is prepared following essentially the same method described in Example 31, Step A, using an equimolar amount of 4-propylbenzaldehyde in place of the benzaldehyde used in that example to give 3-chloro-4-[3-(4-propylphenyl)-acryloyl]phenoxyacetic acid.

*Step B: Preparation of 3-chloro-4-[3-(4-propylphenyl)-propionyl]phenoxyacetic acid.*—The compound prepared in Step A is hydrogenated in essentially the same manner as described in Example 31, Step B, to give 3-chloro-4-[3-(4-propylphenyl)propionyl]phenoxyacetic acid.

*Example 31–C.—3-chloro-4-[3-(4-methoxyphenyl)propionyl]phenoxyacetic acid*

*Step A: Preparation of 3-chloro-4-[3-(4-methylphenyl)-acryloyl]phenoxyacetic acid.*—The above compound is prepared by following essentially the method described in Example 31, Step A, using an equimolar amount of 4-methoxybenzaldehyde in place of the benzaledhyde used in that example to give 3-chloro-4-[3-(4-methoxyphenyl)-acryloyl]phenoxyacetic acid.

*Step B: Preparation of 3-chloro-4-[3-(4-methoxyphenyl)propionyl]phenoxyacetic acid.*—The compound obtained in Step A is converted to 3-chloro-4-[3-(4-methoxyphenyl)propionyl]phenoxyacetic acid following essentially the same process described in Example 31, Step B.

*Example 32.—3-methyl-4-(4-chlorobutyryl)phenoxyacetic acid*

The above product is obtained following substantially the same method described in Example 22, using the following substances:

3-methylphenoxyacetic acid _____ 33.2 g., 0.2 mole.
4-chlorobutyryl chloride _____ 28.2 g., 0.2 mole.
Aluminum chloride, powdered ___ 33.2 g., 0.25 mole.
Carbon disulfide _____ 300 ml.

The product obtained is extracted with ether and the ether extract washed with water, dried over sodium sulfate, filtered and evaporated to dryness on the steam bath. The residue is recrystallized from benzene to give 3-methyl-4-(4-chlorobutyryl)phenoxyacetic acid, M.P. 86.5–88° C.

*Analysis.*—Calculated for $C_{13}H_{15}ClO_4$: C, 57.67; H, 5.59; Cl, 3.10. Found: C, 57.52; H, 5.76; Cl, 13.09.

*Example 33.—3-methyl-4-(4-phenylmercaptobutyryl) phenoxyacetic acid*

A solution of 2.2 ml. of thiophenol in 50 ml. of ethanol containing 1.12 g. of potassium hydroxide and 2.6 g. of 4-(4-chlorobutyryl)-3-methylphenoxyacetic acid is heated on a steam bath for 30 minutes, cooled and poured into 60 ml. of water. The solution is acidified with hydrochloric acid and the resulting oil is extracted with ether. The ethereal extract is washed with water, dried over sodium sulfate, filtered and evaporated to dryness. The residue is recrystallized from carbon tetrachloride to give 3-methyl-4-(4-phenylmercaptobutyryl)-phenoxyacetic acid, M.P. 60–62° C.

*Analysis.*—Calculated for $C_{19}H_{20}O_4S$: C, 66.20; H, 5.84. Found: C, 66.18; H, 5.64.

*Example 33–A.—3-methyl-4-p-tolylmercaptoacetylphenoxyacetic acid*

To a cooled solution of 5.0 g. (0.02 m.) of p-methylthiophenol in 100 ml. of ethanol and 8 ml. of 20% aqueous sodium hydroxide, 4.8 g. (0.02 m.) of 3-methyl-4-chloroacetylphenoxyacetic acid is added. The mixture is heated under reflux for 30 minutes, cooled, poured into 150 ml. of water, acidified with hydrochloric acid and extracted with benzene. The benzene extract is washed with water, dried over sodium sulfate, filtered and concentrated. Crystallization of the product from a mixture of benzene and petroleum ether gives 3-methyl-4-p-tolylmercaptoacetylphenoxyacetic acid, M.P. 117–119° C.

*Analysis.*—Calculated for $C_{18}H_{18}O_4S$: C, 65.45; H, 5.49; S, 9.69. Found: C, 65.83; H, 5.49; S, 9.65.

*Example 34.—Ethyl 3-methyl-4-[4-(4-morpholinyl)-butyryl]phenoxyacetate hydrochloride*

A solution of 3-methyl-4-(4-chlorobutyryl)-phenoxyacetic acid (5.4 g., 0.02 mole) prepared as described in Example 32 and morpholine (8.7 g., 0.1 mole) in 30 ml. of benzene and 50 mg. of potassium iodide, is heated under reflux for 24 hours, filtered and concentrated to dryness in vacuo. The residue is heated under reflux for 2 hours with 50 ml. of 30% alcoholic hydrogen chloride and the solution concentrated to dryness in vacuo. Aqueous sodium bicarbonate is added and the mixture is extracted with ether. The ethereal extract is washed with water, dried over sodium sulfate, filtered and evaporated to dryness on a steam bath. The residue is crystallized from alcoholic hydrogen chloride to give ethyl 3-methyl- 4-[4-(4-morpholinyl)butyryl]phenoxyacetate hydrochloride, M.P. 131.5–134.5° C.

Analysis.—Calculated for $C_{19}H_{22}ClNO_5$: C, 59.14; H, 7.31; N, 3.63. Found: C, 58.92; H, 7.24; N, 3.59.

*Example 35.—2-(3-chloro-4-butyrylphenoxy)ethoxyacetic acid*

Step A: Preparation of 2-(3-chloro-4-butyrylphenoxy)ethanol.—3' - chloro - 4' - hydroxybutyrophenone (120.0 g., 0.604 mole) is added to a solution of potassium hydroxide (40.0 g., 0.604 mole) in absolute ethanol (250 ml.). Ethylene chlorohydrin (48.0 g., 0.604 mole) is added to the resulting yellow solution, and the solution placed in a glass lined autoclave and heated at 150° C. for 6 hours. The sodium chloride that forms is removed by filtration and the filtrate evaporated at reduced pressure, poured into water (100 ml.) and extracted with ether. The ether extract is washed with 5% sodium hydroxide solution (three 60 ml. portions) and then with water and dried over sodium sulfate. The ether is removed by evaporation and the residue distilled, the fraction boiling at 156–170° C. at 0.6 mm. pressure being collected to give 118.5 g. of 2-(3-chloro-4-butyrylphenoxy)ethanol.

Step B: Preparation of 2-(3-chloro-4-butyrylphenoxy)ethoxyacetic acid.—To a mixture of sodium hydride (53% in mineral oil; 5.92 g., 0.124 mole) in 1,2-dimethoxyethane (100 ml.) is added slowly 2-(3-chloro-4-butyrylphenoxy)ethanol (30.0 g., 0.124 mole) in 1,2-dimethoxyethane (50 ml.). The mixture is stirred for ½ hour and ethyl bromoacetate (20.6 g., 0.124 mole) then is added with stirring. The mixture is refluxed for 3 hours and the 1,2-dimethoxyethane then removed by evaporation. Sodium hydroxide (10.0 g., 0.25 mole) in water (50 ml.) is added to the residue and the mixture heated on a steam bath for 2.75 hours. After cooling, the mineral oil is extracted with ether and the residue is acidified with concentrated hydrochloric acid. The oil that separates is removed, washed with water, dissolved in ether and extracted with 10% sodium bicarbonate solution. The sodium bicarbonate solution then is acidified and the oil that forms is extracted with ether, the ether extract separated and dried over sodium sulfate. After removal of the ether by evaporation, the residue is distilled, the fraction boiling at 190–260° C. at 0.5 mm. pressure being collected to give 14.0 g. of 2-(3-chloro-4-butyrylphenoxy)ethoxyacetic acid.

*Example 35–A.—[2-(3-chloro-4-butyrylphenoxy)ethylthio]acetic acid*

Step A: Preparation of 2-(3-chloro-4-butyrylphenoxy)ethylthio]acetic acid.—2 - (3 - chloro - 4 - butyrylphenol prepared as described in Example 35, Step A, is treated with thionyl chloride in pyridine solution to obtain 2-(3-chloro-4-butyrylphenoxy)ethyl chloride.

Step B: Preparation of [2-(3-chloro-4-butyrylphenoxy)ethylthio]acetic acid.—2 - (3 - chloro - 4 - butyrylphenoxy)ethyl chloride is heated with an aqueous alcoholic solution of one equivalent of mercaptoacetic acid and two equivalents of sodium hydroxide. Acidification of the reaction mixture precipitates [2-(3-chloro-4-butyrylphenoxy)ethylthio]acetic acid.

*Example 36.—3-methyl-4-chloroacetylphenoxyacetic acid*

The above product is prepared following substantially the same process described in Example 22 using the following substances:

3-methylphenoxyacetic acid _____ 33.3 g., 0.2 mole.
Chloroacetyl chloride _____ 22.6 g., 0.2 mole.
Aluminum chloride, powdered ____ 80 g., 0.6 mole.
Carbon disulfide _____ 300 ml.

The solid product that forms is collected on the filter, washed with water, air dried and recrystallized from benzene to give 3-methyl-4-chloroacetylphenoxyacetic acid, M.P. 118–120° C.

Analysis.—Calculated for $C_{11}H_{11}ClO_4$: C, 54.44; H, 4.57; Cl, 14.61. Found: C, 54.68; H, 4.66; Cl, 14.45.

*Example 37–A.—3-methyl-4-phenoxyacetylphenoxyacetic acid*

A solution of 3-methyl-4-chloroacetylphenoxyacetic acid, from Example 36 (2.4 g., 0.01 mole) and phenol (1.88 g.), in 50 ml. of water and 4 ml. of 20% aqueous sodium hydroxide is heated on the steam bath for 1 hour, cooled and acidified. The product obtained is crystallized from a mixture of benzene and petroleum ether to give 3-methyl-4-phenoxyacetylphenoxyacetic acid, M.P. 145–148° C.

Analysis.—Calculated for $C_{17}H_{16}O_5$: C, 68.08; H, 5.38. Found: C, 68.31; H, 5.57.

*Example 37–B.—3-methyl-4-benzylmercaptoacetylphenoxyacetic acid*

3-methyl-4-chloroacetylphenoxyacetic acid (2.4 g.), prepared as described in Example 36, is added to a solution of benzylmercaptan (2.5 ml.) in 50 ml. of ethanol and 4 ml. of 20% aqueous sodium hydroxide and heated under reflux for 15 minutes. The solution is cooled, poured into 100 ml. of water, acidified with hydrochloric acid and extracted with benzene. The benzene extract is washed with water, dried over sodium sulfate, filtered and concentrated. Recrystallization of the product thus obtained from a mixture of benzene and petroleum ether gives 3-methyl-4-benzylmercaptoacetylphenoxyacetic acid, M.P. 74–75° C.

Analysis.—Calculated for $C_{18}H_{18}O_4S$: S, 9.71. Found: S, 9.00.

*Example 37–C.—3-methyl-4-(3-carboxypropionyl)phenoxyacetic acid*

To a solution of 16.6 g. (0.1 mole) of 3-methylphenoxyacetic acid and 10.0 g. (0.1 mole) of succinic anhydride in 100 ml. of carbon bisulfide and 50 ml. of nitrobenzene maintained at 30° C., 60 g. (0.44 mole) of aluminum chloride is added portionwise over a 30 minute period. The reaction mixture is allowed to stand at room temperature for 2–3 days. The solvent is decanted and residual solid is added to a mixture of ice and hydrochloric acid. The solid is collected on the filter, dissolved in bicarbonate solution and extracted with ether. The bicarbonate solution is acidified and the product is recrytallized from water to give 16.5 g. of 3-methyl-4-(3-carboxypropionyl)phenoxyacetic acid, M.P. 160–163° C.

Analysis.—Calculated for $C_{13}H_{14}O_6$: C, 58.64; H, 5.30. Found: C, 58.40; H, 5.33.

Other saturated acylphenoxyalkanoic acids (VII) and saturated acylphenylmercaptoalkanoic acids prepared as intermediates in making the novel compounds of this invention are identified in Tables II through VI.

The products in Tables II and III are prepared following substantially the same procedure described in Example 22, with the exception equimolecular quantities of the phenoxyalkanoic (VI) or phenylmercaptoalkanoic acid (VIa) are substituted for the 3-chlorophenoxyacetic acid employed in Example 22, and equimolecular quantities of the acyl halide, $R^2CH_2COCl$, identified in the tables are substituted for the propionyl chloride used in Example 22. In most instances the phenoxyalkanoic acid or the phenylmercaptoalkanoic acid used as a starting material was a known compound. In the few cases where this was not so, the example described the preparation of the product is noted in column 2 of each table. The end products (VII) are identified in each table by melting or boiling point and by elemental analysis for those products that were purified. It should be noted that the radicals $R^2$, $R^3$, $R^4$, $R^5$, $R^6$ and B in the starting materials (VI and VIa) are retained unchanged in the end products (VII) and are identified in the tables.

TABLE II

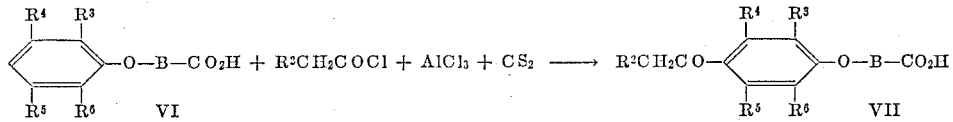

| Ex. No. | Prepn. phenoxy-acetic acid Ex. No. | $R^3$ | $R^4$ | $R^5$ | $R^6$ | B | $R^2$ | End product | | | | | |
|---|---|---|---|---|---|---|---|---|---|---|---|---|---|
| | | | | | | | | Yield, percent | M.P. (B.P.[1]), °C. | Analysis | | | |
| | | | | | | | | | | Empirical | C | H | Cl |
| 38 | | Cl | H | H | H | —CH$_2$— | CH$_3$— | 69 | 147–148 | C$_{11}$H$_{11}$ClO$_4$: Calc. Found | 54.44 54.64 | 4.57 4.79 | 14.61 14.43 |
| 39 | | H | H | H | H | —CH$_2$— | CH$_3$CH$_2$— | 66 | 137–139 | C$_{12}$H$_{14}$O$_4$: Calc. Found | 64.85 64.69 | 6.35 6.53 | |
| 40 | | H | F | H | H | —CH$_2$— | CH$_3$CH$_2$— | 67 | 131.5–133.5 | Not purified | | | |
| 41 | | H | Cl | H | H | —CH$_2$— | CH$_3$CH$_2$— | 51 | 89–90 | C$_{12}$H$_{13}$ClO$_4$: Calc. Found | 56.15 56.24 | 5.10 5.43 | 13.81 13.57 |
| 42 | | Cl | Cl | H | H | —CH$_2$— | CH$_3$CH$_2$— | 77 | 110–111 | C$_{12}$H$_{12}$Cl$_2$O$_4$: Calc. Found | 49.51 49.81 | 4.15 4.22 | 24.36 24.40 |
| 43 | | Cl | H | Cl | H | —CH$_2$— | CH$_3$CH$_2$— | | | Not purified | | | |
| 44 | | H | Br | H | H | —CH$_2$— | CH$_3$CH$_2$— | 63 | 77–78 | C$_{12}$H$_{13}$BrO$_4$) Calc. Found | 49.86 47.94 | 4.35 4.49 | Br, 26.54 Br, 26.37 |
| 45 | | H | I | H | H | —CH$_2$— | CH$_3$CH$_2$— | 30 | 86–87 | C$_{12}$H$_{13}$IO$_4$: Calc. Found | 41.40 41.27 | 3.76 3.92 | I, 36.45 I, 36.23 |
| 46 | | CH$_3$ | H | H | H | —CH$_2$— | CH$_3$CH$_2$— | 83 | 84–86 | C$_{13}$H$_{16}$O$_4$: Calc. Found | 66.08 67.03 | 6.83 6.98 | |
| 47 | | H | CH$_3$ | H | H | —CH$_2$— | CH$_3$CH$_2$— | 65 | 65–66.5 | C$_{13}$H$_{16}$O$_4$: Calc. Found | 66.08 65.42 | 6.83 7.09 | |
| 48 | | CH$_3$ | CH$_3$ | H | H | —CH$_2$— | CH$_3$CH$_2$— | 67 | 87–88 | C$_{14}$H$_{18}$O$_4$: Calc. Found | 67.18 67.74 | 7.25 7.27 | |
| 49 | | CH$_3$ | H | CH$_3$ | H | —CH$_2$— | CH$_3$CH$_2$— | 84 | 125.8–127 | C$_{14}$H$_{18}$O$_4$: Calc. Found | 67.18 67.50 | 7.25 7.14 | |
| 50 | | CH$_3$ | H | H | CH$_3$ | —CH$_2$— | CH$_3$CH$_2$— | 63 | 119–120 | C$_{14}$H$_{18}$O$_4$: Calc. Found | 67.18 67.03 | 7.25 7.29 | |
| 51 | | CH$_3$ | CH$_3$ | CH$_3$ | H | —CH$_2$— | CH$_3$CH$_2$— | 82 | 128–129.5 | C$_{15}$H$_{20}$O$_4$: Calc. Found | 68.16 67.98 | 7.63 7.42 | |
| 52 | | CH$_3$ | CH$_3$ | H | CH$_3$ | —CH$_2$— | CH$_3$CH$_2$— | 95 | 109.5–112 | C$_{15}$H$_{20}$O$_4$: Calc. Found | 68.16 68.15 | 7.63 7.86 | |
| 53 | 20 | CH$_3$ | CH$_3$ | CH$_3$ | CH$_3$ | —CH$_2$— | CH$_3$CH$_2$— | 29 | 143–145 | C$_{16}$H$_{22}$O$_4$. Not analyzed | | | |
| 54 | | H | CH$_3$ | CH$_3$ | H | —CH$_2$— | CH$_3$CH$_2$— | 65 | 83–86 | C$_{14}$H$_{18}$O$_4$: Calc. Found | 67.18 67.11 | 7.25 7.33 | |
| 55 | | H | C$_2$H$_5$ | H | H | —CH$_2$— | CH$_3$CH$_2$— | 64 | (a) | C$_{14}$H$_{18}$O$_4$: Calc. Found | 67.18 67.13 | 7.25 7.27 | |
| 56 | | (CH$_3$)$_2$CH— | H | CH$_3$ | H | —CH$_2$— | CH$_3$CH$_2$— | 96 | 100–101.5 | C$_{16}$H$_{22}$O$_4$: Calc. Found | 69.04 68.72 | 7.97 7.69 | |
| 57 | | CH$_3$ | Cl | H | H | —CH$_2$— | CH$_3$(CH$_2$)$_2$— | 94 | 91–92.5 | C$_{13}$H$_{15}$ClO$_4$: Calc. Found | 57.67 57.96 | 5.59 5.13 | |
| 58 | | H | Cl | H | H | —CH$_2$— | CH$_3$(CH$_2$)$_2$— | 37 | 82.5–83.5 | C$_{13}$H$_{15}$ClO$_4$: Calc. Found | 57.68 57.71 | 5.58 5.43 | 13.10 12.87 |
| 59 | | H | Cl | H | H | —CH$_2$— | (CH$_3$)$_2$CH— | 53 | 107–108 | C$_{13}$H$_{15}$ClO$_4$: Calc. Found | 57.68 57.52 | 5.58 5.71 | 13.10 13.13 |
| 60 | | H | Cl | H | H | —CH$_2$— | CH$_3$(CH$_2$)$_3$— | 18 | 88–89 | C$_{14}$H$_{17}$ClO$_4$: Calc. Found | 59.05 59.05 | 6.02 5.76 | 12.45 12.20 |
| 61 | | H | Cl | H | H | —CH$_2$— | CH$_3$(CH$_2$)$_4$— | 27 | 102.5–103.5 | C$_{15}$H$_{19}$ClO$_4$: Calc. Found | 60.30 60.60 | 6.40 6.52 | 11.87 11.78 |
| 62 | | H | Cl | H | H | —(CH$_2$)$_2$— | CH$_3$— | 40 | 115–117 | C$_{12}$H$_{13}$ClO$_4$: Calc. Found | 56.15 55.76 | 5.13 5.28 | 13.81 13.49 |
| 63 | | H | Cl | H | H | —(CH$_2$)$_2$— | CH$_3$CH$_2$— | 58 | 82.5–84 | C$_{13}$H$_{15}$ClO$_4$: Calc. Found | 57.67 57.52 | 5.58 5.78 | 13.10 13.10 |
| 64 | 26 | Cl | CH$_3$ | H | H | —CH$_2$— | CH$_3$CH$_2$— | 91 | 95–97 | C$_{13}$H$_{15}$ClO$_4$: Calc. Found | 57.67 57.44 | 5.58 5.77 | |
| 65 | | H | CH$_3$ | H | H | —CH$_2$— | CF$_3$\\CH—/CH$_3$ | 20 | 91–93 | C$_{14}$H$_{15}$F$_3$O$_4$: Calc. Found | 55.26 55.50 | 4.97 4.91 | F, 18.73 F, 18.67 |

TABLE II—Continued

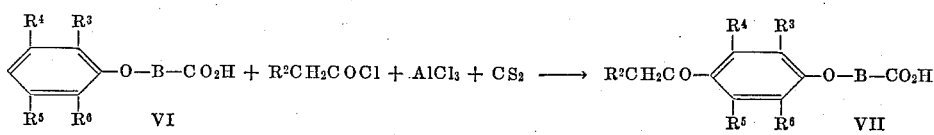

| Ex. No. | Prepn. phenoxy-acetic acid Ex. No. | R³ | R⁴ | R⁵ | R⁶ | B | R² | Yield, percent | M.P. (B.P.[i]), °C. | Empirical | C | H | Cl |
|---|---|---|---|---|---|---|---|---|---|---|---|---|---|
| 66 | | H | Cl | H | H | —CH₂— | (CH₃)₂CHCH₂— | 26 | 89.5-90 | C₁₄H₁₉ClO₄: Calc. Found | 59.05 58.81 | 6.02 6.08 | |
| 67 | | H | Cl | H | H | —CH₂— | [cyclopentyl]H | 43 | 107.5-108.5 | C₁₅H₁₇ClO₄: Calc. Found | 60.71 60.72 | 5.78 6.01 | 11.95 11.90 |
| 68 | | H | Cl | H | H₂ | —CH₂— | [cyclohexyl]H | 35 | 118-118.5 | C₁₆H₁₉ClO₄: Calc. Found | 61.83 61.79 | 6.16 6.36 | 11.41 11.27 |
| 69 | | H | CH₃ | H | H | —CH₂— | H | | 180-182 | C₁₁H₁₂O₄: Calc. Found | 63.45 63.18 | 5.81 5.55 | |
| 70 | | ⌐(CH₂)₃⌐ [b] | | H | H | —CH₂— | C₂H₅— | | 116-118 | C₁₅H₁₈O₄: Calc. Found | 68.68 68.49 | 6.92 6.85 | |
| 71 | | H | Cl | H | H | —CH₂— | CH₃—[cyclohexyl]H | | | Not purified | | | |
| 72 | | H | Cl | H | H | —(CH₂)₂ | CH₃— | 31 | 91.7-93 | C₁₂H₁₃ClO₄: Calc. Found | 56.15 56.51 | 5.11 5.34 | 13.81 13.69 |

[a] 197-199 at 0.2 mm.  [b] 2,3-trimethylene group.

TABLE III

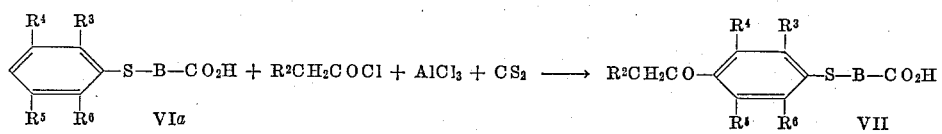

| Ex. No. | Prepn. phenoxymer-capto acetic acid Ex. No. | R³ | R⁴ | R⁵ | R⁶ | B | R² | Yield, percent | M.P., °C. | Empirical | C | H | Cl |
|---|---|---|---|---|---|---|---|---|---|---|---|---|---|
| 73 | | H | Cl | H | H | —CH₂— | CH₃— | 44 | 89-91.5 | C₁₁H₁₁ClO₃S: Calc. Found | 51.05 51.02 | 4.29 4.55 | |
| 74 | | H | CH₃— | H | H | —CH₂— | CH₃— | 37 | 93.5-94.5 | C₁₂H₁₄O₃S: Calc. Found | 60.48 60.47 | 5.92 5.84 | |
| 75 | 21 | H | Cl | H | H | —(CH₂)₂— | CH₃— | 36 | 73-75.5 | C₁₂H₁₃ClO₃S: Calc. Found | 52.84 52.83 | 4.80 5.00 | |

Additional saturated acylphenoxyacetic acids (VII) prepared as intermediates in making the novel compounds of this invention are identified in Table IV. The products identified in Table IV are prepared following substantially the same reaction described in Example 23 with the exception that the acylphenol (IV) identified in Table IV was substituted, in an equimolecular amount, for the 3-propionylphenol employed in Example 23. Column 2 identifies the example which describes the preparation of the acylphenol employed in each example and the saturated acylphenoxyacetic acid (VII) end products obtained are identified by melting point and elemental analysis. It should be noted that the radicals R², R³, R⁴, R⁵ and R⁶ in the starting materials (IV) are retained unchanged in the end products and are identified in Table IV.

TABLE IV

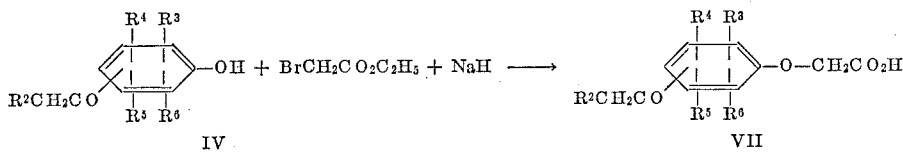

| Ex. No. | Prepn. of acylphenol Ex. No. | R³ | R⁴ | R⁵ | R⁶ | Position of R²CH₂CO | R² | Yield, percent | M.P., °C | Empirical | C | H | Cl |
|---|---|---|---|---|---|---|---|---|---|---|---|---|---|
| 76 | 9 | 2—CH₃ | 3—H | 4—CH₃ | 6—H | 5 | C₂H₅— | 57 | 98.5-99.5 | C₁₄H₁₈O₄: Calc. / Found | 67.18 / 67.44 | 7.25 / 6.98 | |
| 77 | 4 | 6—H | 3—CH₃ | 4—H | 5—CH₃ | 2 | C₂H₅— | 64 | 108-109 | Not purified | | | |
| 78 | 5 | 6—H | 3—Cl | 4—H | 5—Cl | 2 | C₂H₅— | 74 | 99-101 | C₁₂H₁₂Cl₂O₄: Calc. / Found | 49.50 / 49.70 | 4.16 / 4.19 | |
| 79 | 3 | 6—H | 3—H | 4—H | 5—Cl | 2 | CH₃— | | 118.5-119.5 | C₁₁H₁₁ClO₄: Calc. / Found | 54.44 / 54.33 | 4.57 / 4.52 | 14.61 / 14.33 |
| 80 | 6 | 2—Cl | 4—Cl | 5—H | 6—H | 3 | C₂H₅— | 56 | 103-105 | C₁₂H₁₂Cl₂O₄: Calc. / Found | 49.50 / 49.62 | 4.16 / 4.39 | |
| 81 | 7 | 2—Cl | 4—H | 5—H | 6—H | 3 | C₂H₅— | 62 | 74.5-76.5 | C₁₃H₁₃ClO₄: Calc. / Found | 56.15 / 56.00 | 5.10 / 5.19 | |
| 82 | 8 | 6—H | 3—CH₃ | 4—H | 5—H | 2 | C₂H₅— | 61 | 112.5-114.5 | C₁₃H₁₆O₄: Calc. / Found | 66.08 / 66.28 | 6.83 / 6.84 | |
| 83 | 15 | 2—H | 3—Cl | 5—H | 6—H | 4 | (CH₃)₃—C— | | 103-104 | C₁₄H₁₇ClO₄: Calc. / Found | 59.04 / 59.01 | 6.01 / 5.86 | 12.31 / 12.28 |
| 84 | 1 | 2—Cl | 3—Cl | 5—H | 6—H | 4 | H⟨⟩— | 76 | 127-128 | C₁₅H₁₆Cl₂O₄: Calc. / Found | 54.41 / 54.84 | 4.87 / 4.92 | 21.42 / 21.36 |
| 85 | 18 | 2—Cl | 3—Cl | 5—H | 6—H | 4 | H⟨⟩— | | 147-148 | C₁₆H₁₈Cl₂O₄: Calc. / Found | 55.66 / 56.25 | 5.26 / 5.18 | 20.54 / 20.55 |
| 86 | 19 | 2—H | 3—Cl | 5—H | 6—H | 4 | ⟨⟩— | 7.0 | 117-118 | C₁₆H₁₃ClO₄: Calc. / Found | 61.83 / 61.79 | 6.16 / 6.36 | 11.41 / 11.27 |

The saturated acylphenoxyalkanoic acids (VII) identified in Table V are prepared following substantially the same procedure described in Example 24 with the exception an equimolecular quantity of the acylphenol (IV) identified in Table V is substituted for the 2'-chloro-4'-hydroxybutyrophenone used in Example 24, and an equimolecular quantity of the halocarboxylate, Br-BCO₂C₂H₅, also identified in Table V is substituted for the ethyl α-bromobutyrate used in Example 24. Column 2 of the table identifies the example which describes the preparation of the acylphenol (IV) employed in each example (if no example number is given, the acylphenol is a known compound), and the acylphenoxyalkanoic acid (VII) end products obtained are identified by melting point and elemental analysis. It should be noted that the radicals, R², R³, R⁴, R⁵, R⁶ and B in the starting materials are retained unchanged in the acylphenoxyalkanoic acid (VII) end products and are identified in Table V.

TABLE V

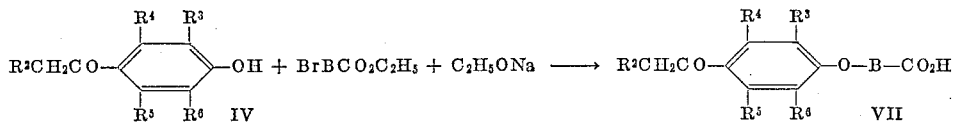

| Ex. No. | Prepn. acylphenol Ex. No. | R³ | R⁴ | R⁵ | R⁶ | B | R² | Yield, percent | M.P., °C | Empirical | C | H | Cl |
|---|---|---|---|---|---|---|---|---|---|---|---|---|---|
| 87 | 13 | NO₂ | CH₃ | H | H | —CH₂— | C₂H₅— | 53 | 134-136 | C₁₃H₁₅NO₆: Calc. / Found | 55.51 / 55.09 | 5.37 / 5.25 | N, 4.98 / N, 5.00 |
| 88 | 10 | H | Cl | H | H | —CH— / CH₃—CH—CH₃ | C₂H₅— | | 68-69 | C₁₅H₁₈ClO₄: Calc. / Found | 60.30 / 60.59 | 6.41 / 6.32 | 11.87 / 11.71 |
| 89 | | —(CH₂)₄— ᵃ | | H | H | —CH₂— | C₂H₅— | | 106-108 | C₁₆H₂₀O₄: Calc. / Found | 69.54 / 69.28 | 7.30 / 7.19 | |

ᵃ End product is 2,3-tetramethylene-4-butyrylphenoxyacetic acid. Reaction was run in presence of sodium isopropoxide.

The saturated acylphenoxyacetic acids (VII) identified in Table VI are prepared following substantially the same procedure described in Example 25 with the exception an equimolecular quantity of the acylphenol (IV) identified in Table VI is substituted for the 3',5'-dichloro-4'-hydroxybutyrophenone employed in Example 25.

Column 2 of Table VI identifies the preparation of the acylphenol (IV) employed in each example (if no example number is given, the acylphenol is a known compound) and the acylphenoxyacetic acid (VII) end products obtained are identified by melting point, and, where purified, by elemental analysis. It should be noted that the radicals $R^2$, $R^3$, $R^4$, $R^5$, and $R^6$ in the starting materials are retained unchanged in the end products (VII) and are identified in Table VI.

kept at a temperature between about 25 to 30° C. for 1 hour and then boiled for 20 minutes, cooled, diluted with water and acidified with hydrochloric acid to yield 3-chloro - 4 - [2 - phenyl - 3 - (1 - piperidyl)propionyl] phenoxyacetic acid hydrochloride.

*Example 97.—3-trifluoromethyl-4-[2-(dimethylaminomethyl)-butyryl]phenoxyacetic acid hydrochloride*

Step A: Preparation of 3 - trifluoromethyl - 4 - bromophenyl allyl ether.—3-trifluoromethyl - 4 - bromophenol

TABLE VI

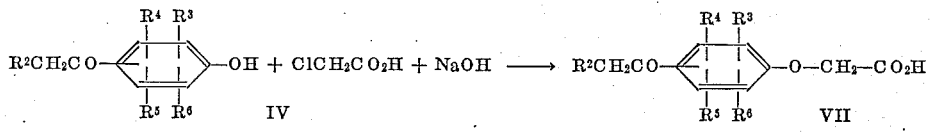

| Ex. No. | Prepn. acyl-phenol Ex. No. | $R^3$ | $R^4$ | $R^5$ | $R^6$ | Position of $R^2CH_2CO$ | $R^2$ | End Product | | | | | |
|---|---|---|---|---|---|---|---|---|---|---|---|---|---|
| | | | | | | | | Yield, percent | M.P., ° C. | Analysis | | | |
| | | | | | | | | | | Empirical | C | H | Cl |
| 90 | | 2-H | 3—OCH$_2$CO$_2$H | 5-H | 6-H | 4 | C$_2$H$_5$— | 54 | 159.2–160 | $C_{14}H_{16}O_7$: Calc. Found | 56.75 56.85 | 5.44 5.12 | |
| 91 | 11 | 2-H | 3—Cl | 5-Cl | 6-H | 4 | C$_2$H$_5$— | 65 | 112–113 | $C_{12}H_{12}Cl_2O_4$: Calc. Found | 49.51 49.94 | 4.15 4.31 | 24.36 24.10 |
| 92 | 12 | 2-Br | 3—Cl | 5-H | 6-H | 4 | C$_2$H$_5$— | 42 | 105.5–107 | $C_{12}H_{12}BrClO_4$: Calc. Found | 42.95 42.16 | 3.60 3.59 | Br, 23.81 Br, 23.76 |
| 93 | 14 | 2-H | 3—NHCOCH$_3$ | 5-H | 6-H | 4 | C$_2$H$_5$— | 21 | 177–179 | Not purified | | | |
| 94 | 16 | 2-Cl | 3—Cl | 5-H | 6-H | 4 | (CH$_3$)$_2$CH— | 64 | 110.5–112 | $C_{13}H_{14}Cl_2O_4$: Calc. Found | 51.17 51.42 | 4.62 4.77 | 23.24 23.07 |
| 95 | 16 | 2-Cl | 3—Cl | 5-H | 6-H | 4 | (CH$_3$)$_2$CHCH$_2$— | 67 | 108.5–109.5 | $C_{14}H_{16}Cl_2O_4$: Calc. Found | 52.68 52.80 | 5.05 5.08 | 22.22 22.02 |

Examples 96 through 184 which follow describe the preparation of novel β-aminoacylphenoxy- and β-aminoacylphenylmercapto derivatives of monocarboxylic acid compounds (VIII) of this invention. It should be understood that the products described below are representative of the novel products of this invention and that the invention is not limited to those compounds specifically described. The invention also contemplates the inclusion of other related compounds which fall within the scope of the disclosure and the appended claims.

*Example 96.—3-chloro-4-[2-(dimethylaminomethyl) butyryl]-phenoxyacetic acid hydrochloride*

In a 100 ml. round flask equipped with an outlet tube suitable for application of intermittent suction, an intimate mixture of

| | |
|---|---|
| 3 - chloro - 4 - butyrylphenoxyacetic acid (from Example 38) | 5.12 g., 0.02 mole. |
| Paraformaldehyde | 0.7 g., 0.022 mole. |
| Dimethylamine hydrochloride | 1.78 g., 0.02 mole. |
| Acetic acid | 4 drops. | is heated on the steam bath for about 1.5 hours during which time suction is applied for about one minute intervals five or six times. Upon cooling, the product is isolated by triturating the reaction mixture with acetone. The white solid that forms is crystallized from acetonitrile and then from isopropyl alcohol to give 3-chloro-4-[2-(dimethylaminomethyl)butyryl]phenoxyacetic acid hydrochloride, M.P. 127–129° C.

*Analysis.*—Calculated for $C_{15}H_{20}ClNO_4 \cdot HCl$: C, 51.44; H, 6.04; Cl, 20.25. Found: C, 51.32; H, 5.90; Cl, 20.19.

*Example 96–A.—3-chloro-4-[2-phenyl-3-(1-piperidyl)-propionyl]phenoxyacetic acid hydrochloride*

3-chloro - 4 - phenylacetylphenoxyacetic acid (3.04 g., 0.01 mole) (from Example 86) and piperidine (1.87 g., 0.022 mole) are dissolved in methanol (30 ml.) and 37% formaldehyde (1.5 ml.) is added. The mixture is (12.05 g., 0.05 mole) in solution in methanol is added to a solution of potassium hydroxide (2.81 g., 0.05 mole) in 85% methanol (35 ml.). The solvent then is evaporated and the residue dissolved in glycol dimethyl ether (50 ml.). Allyl bromide (6.05 g., 0.05 mole) is added and the mixture then refluxed for 1½ hours. Potassium bromide is removed by filtration and the solvent evaporated. The residue is distilled yielding 10.5 g. of 3-trifluoromethyl - 4 - bromophenyl allyl ether, B.P. 78° C. at 1 mm. pressure.

*Analysis.*—Calculated for $C_{10}H_8BrF_3O$: C, 42.73; H, 2.87. Found: C, 42.19; H, 3.21.

Step B: Preparation of 3-trifluoromethyl-4-(1-hydroxybutyl)phenyl allyl ether.—To magnesium turnings (2.60 g., 0.14 mole) in ether (150 ml.) there is added 3-trifluoromethyl - 4 - bromophenyl allyl ether (20 g., 0.0712 mole). The reaction is initiated and kept in progress by the slow addition of ethylene bromide (12.4 g., 0.0712 mole). After the magnesium has been consumed, butyraldehyde (5.12 g., 0.0712 mole) is added and the mixture refluxed for 1½ hours. The reaction mixture then is hydrolyzed by adding it to a saturated solution of ammonium chloride. The product is extracted with ether, the ether extract dried over sodium sulfate and evaporated. The residue is distilled yielding 11 g. of an oil, B.P. 70–102° C. (0.3 mm. pressure). The oil (7.92 g.) was placed on a 4 cm. column of alumina (350 g.) and eluted with benzene until the effluent benzene contains no solute. This effluent is discarded. The product then is eluted with a mixture of benzene and ether (2:1) and then with a mixture of benzene and ether (1:2) until the effluent contains no solute. The combined benzene-ether effluents are combined and evaporated yielding 5.5 g. of 3-trifluoromethyl-4-(1-hydroxybutyl)phenyl allyl ether, $N_D^5$ 1.4836.

*Analysis.*—Calculated for $C_{14}H_{17}F_3O_2$: C, 61.31; H, 6.25; F, 20.78; Found: C, 61.79; H, 6.26; F, 20.18.

Step C: Preparation of 3-trifluoromethyl-4-butyrylphenyl allyl ether.—The compound prepared in Step B (5.3 g., 0.0193 mole) is dissolved in acetone (30 ml.) and kept at 0° C. (internal temperature) while a solution of chromium trioxide (3.86 g., 0.0396 mole) in a mixture of water (10 ml.) and sulfuric acid (3.26 ml.) is added slowly with stirring. After stirring an additional 2 hours, the mixture is diluted with cold water and extracted with ether. The ether extract is washed with water, dried over sodium sulfate and evaporated, yielding an oil (4.9 g.) which upon distillation at 0.3 mm. pressure yields pure 3-trifluoromethyl-4-butyrylphenyl allyl ether.

*Analysis.*—Calculated for $C_{14}H_{15}F_3O_2$: C, 61.76; H, 5.55. Found: C, 61.78; H, 5.63.

Step D: *Preparation of 3-trifluoromethyl-4-butyrylphenoxyacetic acid.* — 3-trifluoromethyl-4-butyrylphenyl allyl ether (4.4 g., 0.018 mole) and sodium bicarbonate (1 g.) are added to acetone (80 ml.) and the mixture kept at −10° C. (internal temperature) while potassium permanganate (8.54 g., 0.054 mole) is added slowly. The mixture is stirred for 2 hours, diluted with water and sulfur dioxide bubbled through the mixture until a colorless solution is obtained. The product then is extracted with ether, the ether solution extracted with 5% sodium hydroxide solution, and the basic extract chilled, acidified with 12 N hydrochloric acid and again extracted with ether. The ether extract then is dried and evaporated and the residue obtained crystallized from benzene to yield 3-trifluoromethyl-4-butyrylphenoxyacetic acid. (1.5 g.), M.P. 96–97° C.

*Analysis.*—Calculated for $C_{13}H_{13}F_3O_4$: C, 53.79; H, 4.51; F, 19.63. Found: C, 53.98; H, 4.62; F, 20.00.

Step E: *Preparation of 3-trifluoromethyl-4-[2-(dimethylaminomethyl) butyryl]-phenoxyacetic acid hydrochloride.*—A flask of the type described in Example 96 is charged with the following:

3-trifluoromethyl-4-butyryl-
 phenoxyacetic acid _____ 1 g., 0.0034 mole.
Paraformaldehyde _____ 0.12 g., 0.004 mole.
Dimethylamine hydrochloride __ 0.298 g., 0.0036 mole.
Acetic acid _____ 6 drops.

The mixture is heated on a steam bath, with intermittent suction for 2 hours to give 3-trifluoromethyl-4-[2-(dimethylaminomethyl)butyryl] phenoxyacetic acid hydrochloride.

Other β-aminoacylphenoxyalkanoic acids (VIII) and other β-aminoacylphenylmercaptoalkanoic acids of this invention are made following substantially the same procedure described in Example 96. While in most instances the reaction is carried out with intermittent suction, it is not in some instances essential to do so and the product will be formed upon heating the reaction mixture between 90–100° C. until a sample of the reaction mixture is essentially completely soluble in water.

The novel compounds of this invention identified in the following tables are made by substantially the same method described above, employing the same molar ratio of reactants used in Example 96. Several tables are used to describe the novel products of this invention in order to simplify presentation of various types of products which illustrate the scope of this invention. In each instance, the table identifies the acylphenoxyalkanoic acid (VII) or acylphenylmercaptoalkanoic acid used as well as the example where its preparation is described. The table also identifies the amine reactant as well as the solvent used in the primary trituration of the reaction product. Crystallization solvents employed in isolating and purifying the end product also are identified in the tables, and melting points and analysis are given for those products which are purified. The radicals $R^2$, $R^3$, $R^4$, $R^5$, $R^6$, B, Y and $Y^1$, where applicable, are identified in the tables. It should be noted that the radicals $R^2$, $R^3$, $R^4$, $R^5$, $R^6$, B, Y and $Y^1$ in the starting materials are retained unchanged in the end products.

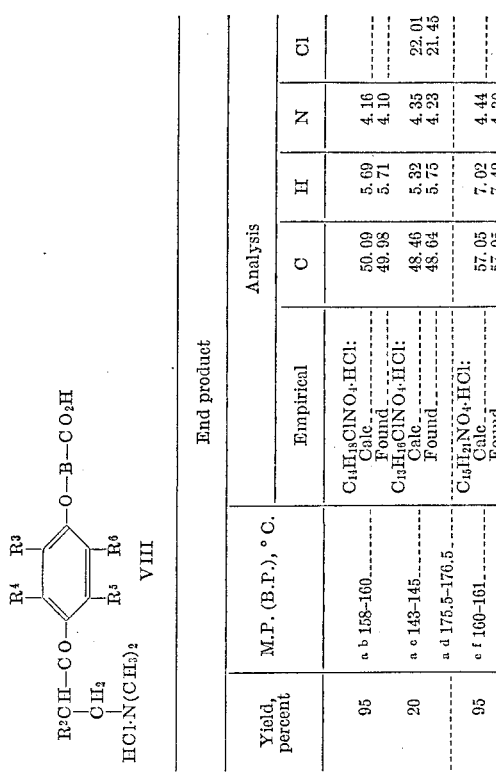

TABLE VII

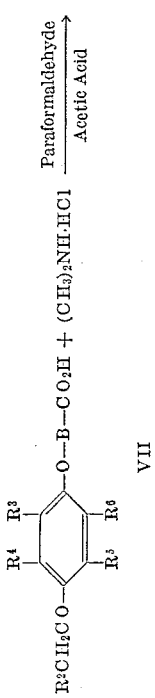

| Ex. No. | Prepn. VII Ex. No. | $R^3$ | $R^4$ | $R^5$ | $R^6$ | B | $R^2$ | Yield, percent | M.P. (B.P.), °C. | End product Empirical | Analysis C | H | N | Cl |
|---|---|---|---|---|---|---|---|---|---|---|---|---|---|---|
| 98 | 22 | H | Cl | H | H | —CH$_2$— | CH$_3$ | 95 | a b 158–160 | $C_{14}H_{15}ClNO_4 \cdot HCl$: Calc. Found | 50.09 49.98 | 5.69 5.71 | 4.16 4.10 | |
| 99 | 30 | H | Cl | H | H | —CH$_2$— | H | 20 | a c 143–145 | $C_{13}H_{13}ClNO_4 \cdot HCl$: Calc. Found | 48.46 48.64 | 5.32 5.75 | 4.35 4.23 | 22.01 21.45 |
| 100 | 38 | Cl | H | H | H | —CH$_2$— | CH$_3$ | | a d 175.5–176.5 | | | | | |
| 101 | 39 | H | H | H | H | —CH$_2$— | C$_2$H$_5$ | 95 | e f 160–161 | $C_{15}H_{21}NO_4 \cdot HCl$: Calc. Found | 57.05 57.05 | 7.02 7.40 | 4.44 4.30 | |

| | | | | | | | | | | | |
|---|---|---|---|---|---|---|---|---|---|---|---|
| 102 | 40 | H | H | F | -CH₂- | C₂H₅- | | | | | |
| 103 | 42 | Cl | H | Cl | -CH₂- | C₂H₅- | | a g 173.5-175.5 | 73 | C₁₅H₂₀FNO₄·HCl: Calc Found | 53.97 54.16 | 6.34 6.63 | 4.20 4.07 | |
| 104 | 43 | Cl | Cl | H | -CH₂- | C₂H₅- | | a b 165-167 | 64 | C₁₅H₁₉Cl₂NO₄·HCl: Calc Found | 46.83 46.69 | 5.24 5.31 | 3.64 3.53 | 27.65 27.59 |
| 105 | 28 | Cl | H | H | -CH₂- | C₂H₅- | | | | Not purified | | | | |
| 106 | 44 | H | H | Br | -CH₂- | C₂H₅- | | | | Not purified | | | | |
| 107 | 45 | H | H | I | -CH₂- | C₂H₅- | | | | Not purified | | | | |
| 108 | 46 | CH₃ | H | H | -CH₂- | C₂H₅- | | a i 182-184.5 | 87 | C₁₆H₂₃NO₄·HCl: Calc Found | 58.26 58.62 | 7.33 7.11 | 4.25 4.14 | |
| 109 | 47 | H | CH₃ | H | -CH₂- | C₂H₅- | | a g 120-126 | 70 | Not analyzed | | | | |
| 110 | 48 | CH₃ | CH₃ | H | -CH₂- | C₂H₅- | | a i 178.5-180 | 90 | C₁₇H₂₅NO₄·HCl: Calc Found | 59.38 59.52 | 7.62 7.35 | 4.07 3.87 | |
| 111 | 49 | CH₃ | H | CH₃ | -CH₂- | C₂H₅- | | i 176.5-178.5 | 84 | C₁₇H₂₅NO₄·HCl: Calc Found | 59.38 59.22 | 7.62 7.37 | 4.07 3.99 | |
| 112 | 50 | CH₃ | CH₃ | CH₃ | -CH₂- | C₂H₅- | | a i 186.5-188.5 | 92 | C₁₇H₂₅NO₄·HCl: Calc Found | 59.38 59.27 | 7.62 7.55 | 4.07 3.80 | |
| 113 | 51 | CH₃ | CH₃ | H | -CH₂- | C₂H₅- | | | 61.5 | C₁₈H₂₇NO₄·HCl: Not purified | 60.40 60.07 | 7.89 7.88 | 3.91 3.85 | |
| 114 | 52 | CH₂ | H | CH₃ | -CH₂- | C₂H₅- | | a i 185.5-187.5 | 37 | C₁₉H₂₉NO₄·HCl: Calc Found | 61.36 62.06 | 8.13 7.98 | 3.77 3.49 | |
| 115 | 53 | CH₃ | CH₃ | CH₃ | -CH₂- | C₂H₅- | | | | Not purified | | | | |
| 116 | 54 | H | CH₃ | H | -CH₂- | C₂H₅- | | | | Not purified | | | | |
| 117 | 55 | (CH₃)₂CH- | C₂H₅- | H | -CH₂- | C₂H₅- | | | | Not purified | | | | |
| 118 | 56 | H | CH₃ | H | -CH₂- | C₂H₅- | | | | Not purified | | | | |
| 119 | 27 | H | CH₃O- | H | -CH₂- | C₂H₅- | | | | Not purified | | | | |
| 120 | 57 | CH₃ | H | Cl | -CH₂- | C₂H₅- | | a g 171.5-172.5 | 60 | C₁₆H₂₂ClNO₄·HCl: Calc Found | 52.75 53.65 | 6.36 6.04 | | |
| 121 | 58 | H | H | Cl | -CH₂- | CH₃(CH₂)₂CH- | | j 167-169 | | C₁₆H₂₂ClNO₄·HCl: Calc Found | 57.75 57.47 | 6.36 6.37 | | 19.46 19.09 |
| 122 | 59 | H | H | Cl | -CH₂- | (CH₃)₂CH- | | a 114-120 | 55 | C₁₈H₂₆ClNO₄·HCl: Calc Found | 55.10 55.01 | 6.94 6.65 | | 18.08 17.64 |
| 123 | 60 | H | H | Cl | -CH₂- | CH₃(CH₂)₃- | | a k 146-148.5 (uncorr.) | | Not purified Not purified | | | | |
| 124 | 61 | H | H | HO₂CCH₂O- | -CH₂- | CH₃(CH₂)₂- | | | | Not purified | | | | |
| 125 | 90 | H | H | Cl | -CH₂- | CH₃ | | e d 158-159 | 62 | C₁₆H₂₂ClNO₄·HCl: Calc Found | 52.75 52.87 | 6.36 6.64 | 3.85 3.79 | |
| 126 | 62 | H | H | Cl | -CH- | CH₃ | | | | | | | | |
| 127 | 63 | H | H | Cl | -CH- C₂H₅ | C₂H₅- | | e d 158-159 | 32 | C₁₇H₂₄ClNO₄·HCl: Calc Found | 53.97 54.28 | 6.66 6.52 | 3.70 3.63 | |
| 128 | 24 | H | H | Cl | -(CH₂)₂- -CH₂- | C₂H₅- CH₃- | | | | Not purified Not purified | | | | |
| 129 | 72 | H | H | Cl | -CH₂- | CH₃- C₂H₅- | | | | Not purified | | | | |
| 130 | 91 | | | | | | | | | | | | | |
| 131 | 31 | H | H | Cl | -CH₂- | -CH₂-⌬- | | | 70 | Not purified | | | | |
| 132 | 37—C | H | CH₃ | CH₃ | -CH₂- | HO₂C-CH₂- | | | | Not purified | | | | |
| 133 | 92 | Br | Cl | Cl | -CH₂- | C₂H₅- | | | | Not purified | | | | |
| 134 | 64 | Cl | Br | Cl | -CH₂- | C₂H₅- | | | | Not purified | | | | |
| 135 | 87 | NO₂ | NO₂ | CH₃CONH | -CH₂- | C₂H₅- | | | | Not purified | | | | |
| 136 | 93 | H | H | Cl | -CH- CH₃-CH-CH₃ | C₂H₅- | | | | | | | | |
| 137 | 88 | H | H | Cl | | | | | | Not purified | | | | |

TABLE VII—Continued

| Ex. No. | Prepn. VII Ex. No. | R³ | R⁴ | R⁵ | R⁶ | B | R² | Yield, percent | M.P. (B.P), °C. | End product Empirical | Analysis C | H | N | Cl |
|---|---|---|---|---|---|---|---|---|---|---|---|---|---|---|
| 138 | 83 | H | Cl | H | H | —CH₂— | (CH₃)₃C— | | | Not purified | | | | |
| 139 | 94 | Cl | Cl | H | H | —CH₂— | (CH₃)₂CH— | | | Not purified | | | | |
| 140 | 65 | H | CH₃ | H | H | —CH₂— | F₃C—CH—CH₃ | | | Not purified | | | | |
| 141 | 66 | H | Cl | H | H | —CH₂— | (CH₃)₂CHCH₂— | | | Not purified | | | | |
| 142 | 95 | Cl | Cl | H | H | —CH₂— | (CH₃)₂CHCH₂— | | | Not purified | | | | |
| 143 | 67 | H | Cl | H | H | —CH₂— | ⌬H | | | Not purified | | | | |
| 144 | 84 | Cl | Cl | H | H | —CH₂— | ⌬H | | | Not purified | | | | |
| 145 | 68 | H | Cl | H | H | —CH₂— | ⌬H | | | Not purified | | | | |
| 146 | 85 | Cl | Cl | H | H | —CH₂— | ⌬H | | | Not purified | | | | |
| 147 | 37—A | H | CH₃ | H | H | —CH₂— | ⌬—O— | | | Not purified | | | | |
| 148 | 37—B | H | CH₃ | H | H | —CH₂— | ⌬—CH₂—S— | | | Not purified | | | | |
| 149 | 33 | H | CH₃ | H | H | —CH₂— | ⌬—S—(CH₂)₂ | | ᵃⁱ 161–162 | C₂₂H₂₇NO₅S·HCl: Calc. Found | 60.40 61.02 | 6.44 6.98 | 3.19 2.84 | |
| 150 | 69 | H | CH₃ | H | H | —CH₂— | H | | 160–162 | C₁₄H₁₉NO₄·HCl: Calc. Found | 55.72 55.92 | 6.68 6.79 | 4.64 4.56 | |
| 151 | 35 | H | Cl | H | H | (CH₂)₂—O—CH₂ | C₂H₅— | | | Not purified | | | | |
| 152 | 89 | —(CH₂)₄—* | | H | H | —CH₂— | C₂H₅— | | ¹ᵈ 179–183 | C₁₈H₂₅NO₄·HCl: Calc. Found | 60.75 60.45 | 7.36 7.35 | | 11.75 11.59 |
| 153 | 70 | —(CH₂)₃—† | | H | H | —CH₂— | C₂H₅— | | 170–171.5 | | | | | |

ᵃ Triturated with ether.
ᵇ Crystallized from methanol.
ᶜ Crystallized from isopropyl alcohol and from ethanol.
ᵈ Crystallized from an ethanol acetone mixture.
ᵉ Triturated with acetone.
ᶠ Crystallized from isopropyl alcohol and from acetonitrile.
ᵍ Crystallized from mixture of isopropyl alcohol and ether.
ʰ Crystallized from mixture of methanol and ether.
ⁱ Crystallized from mixture of ethanol and ether.
ʲ Digested in hot acetone.
ᵏ Crystallized from acetonitrile.
ˡ Triturated with isopropyl alcohol.
ᵐ Triturated with hot ethyl acetate.
\* 2,3-tetramethylene group.
† 2,3-trimethylene group.
‡ This compound is ethyl 3-methyl-4-[2-dimethylaminomethyl-4-(4-morpholinyl)butyryl]phenoxyacetate.
§ This group is ethylenethiomethylene, —(CH₂)₂—S—CH₂—.

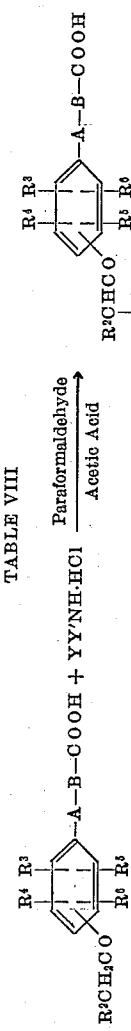

TABLE VIII—Continued

| Ex. No. | Prepn. VII Ex. No. | $R^3$ | $R^4$ | $R^5$ | $R^6$ | A | B | Pos. of acyl grp. | $R^2$ | Y Y' \ / N / | Yield, percent | M.P., °C. | End product Empirical | Analysis C | Analysis H | Analysis N | Analysis Cl |
|---|---|---|---|---|---|---|---|---|---|---|---|---|---|---|---|---|---|
| 164 | 80 | 2—Cl | 3—H | 4—Cl | 6—H | O | —CH$_2$— | 3 | C$_2$H$_5$— | (CH$_3$)$_2$N— | | Syrup | Not purified | | | | |
| 165 | 81 | 2—Cl | 4—H | 5—H | 6—H | O | —CH$_2$— | 3 | C$_2$H$_5$— | (CH$_3$)$_2$N— | | Syrup | Not purified | | | | |
| 166 | 82 | 6—H | 3—CH$_3$ | 4—H | 5—H | O | —CH$_2$— | 2 | C$_2$H$_5$— | (CH$_3$)$_2$N— | 60 | d 158–160 | Not purified | | | | |
| 167 | 34 | 2—H | 3—CH$_3$ | 5—H | 6—H | O | —CH$_2$— | 4 | $\underset{H}{\underset{|}{\bigcirc}}$—N—(CH$_2$)$_2$— (morpholinyl) | (CH$_3$)$_2$N— | | | Not purified | | | | |
| 168 | 42 | 2—Cl | 3—Cl | 5—H | 6—H | O | —CH$_2$— | 4 | C$_2$H$_5$— | CH$_3$—(CH$_2$)$_3$—N(CH$_3$)— | 85 | k 156.5–159.5 | C$_{18}$H$_{23}$Cl$_2$NO$_4$·HCl: Calc. / Found | 50.03 / 50.69 | 5.73 / 5.89 | 3.29 / 3.52 | 25.04 / 25.06 |
| 169 | 69 | 2—H | 3—CH$_3$ | 5—H | 6—H | O | —CH$_2$— | 4 | H | CH$_3$—(CH$_2$)$_3$—N(CH$_3$)— | | | | | | | |
| 170 | 69 | 2—H | 3—CH$_3$ | 5—H | 6—H | O | —CH$_2$— | 4 | H | CH$_3$—(CH$_2$)$_3$—N(CH$_3$)— | | | | | | | |
| 171 | 69 | 2—H | 3—CH$_3$ | 5—H | 6—H | O | —CH$_2$— | 4 | H | (CH$_2$)$_2$—N—(CH$_2$)$_2$ with CH$_3$ | | | | | | | |
| 172 | 33—A | 2—H | 3—CH$_3$ | 5—H | 6—H | O | —CH$_2$— | 4 | CH$_3$—⬡—S— | (CH$_3$)$_2$N— | | | | | | | |
| 173 | 71 | 2—H | 3—Cl | 5—H | 6—H | O | —CH$_2$— | 4 | CH$_3$—⬡—H | (CH$_3$)$_2$N— | | | | | | | |
| 174 | 31—A | 2—H | 3—Cl | 5—H | 6—H | O | —CH$_2$— | 4 | Cl—⬡—CH$_2$— | (CH$_3$)$_2$N— | | | | | | | |

The following examples describe the preparation of representative β-aminoacylphenoxybenzoic acid compounds that also come within the purview of this invention. While the β-aminoacylphenoxybenzoic acid compounds are prepared by substantially the same method described in Example 96, the acylphenoxybenzoic acids which are used as intermediates in this step are prepared by methods which differ from those used in the preparation of the acylphenoxyalkanoic acids. Methods adaptable to the preparation of acylphenoxybenzoic acids are described in the following examples and can be employed in the preparation of other compounds of this type which come within the scope of this invention. These procedures generally can be adapted to prepare the corresponding acylphenylmercaptobenzoic acid compounds also.

*Example 179.—4-{3-chloro-4-[2-(dimethylaminomethyl) propionyl]-phenoxymethyl}benzoic acid hydrochloride*

Step A: Preparation of ethyl 4-(3-chloro-4-propionylphenoxymethyl)benzoate.—3 - chloro-4-propionylphenol 18 g. (0.10 mole) is dissolved in 50 ml. of anhydrous methanol. Clean sodium metal (1.85 g., 0.08 mole) is added in portions. Ethyl 4-chloromethylbenzoate (10 g., 0.05 mole) is added when the sodium is dissolved. The reaction mixture then is refluxed 4 hours, the mixture allowed to cool and 100 ml. of water is added. The reaction mixture is extracted with ethyl ether, washed with 5% sodium hydroxide and water and the organic phase dried and evaporated to give a brown oil which crystallizes on standing. After recrystallization from ethanol there is obtained 15 g. (86%) of ethyl 4-(3-chloro-4-propionylphenoxymethyl)benzoate, M.P. 58–60° C.

Analysis.—Calculated for $C_{19}H_{19}O_4Cl$: C, 65.71; H, 5.47. Found: C, 66.26; H, 5.55.

Step B: Preparation of 4-(3-chloro-4-propionylphenoxymethyl)benzoic acid.—Ethyl 4-(3-chloro-4-propionylphenoxymethyl)benzoate (5 g., 0.015 mole) in 5% sodium hydroxide solution (20 ml.) is heated with stirring on a steam bath for 3.5 hours. Upon cooling and with acidification with concentrated hydrochloric acid a white solid is obtained, which after recrystallization from a mixture of ethanol and water gives 4.1 g. (90%) of 4-(3-chloro-4 - propionylphenoxymethyl)benzoic acid, M.P. 153–155° C.

Analysis.—Calculated for $C_{17}H_{15}O_4Cl$: C, 63.95; H, 4.70. Found: C, 64.18; H, 4.91.

Step C: Preparation of 4-{3-chloro-4-[2-(dimethylaminomethyl)propionyl]phenoxymethyl}benzoic acid hydrochloride.—The above product is prepared following substantially the same procedure described in Example 96, except the materials listed below are heated at 120–130° C. for ½ hour:

4-(3-chloro-4-propionylphenoxymethyl)benzoic acid _____ 5.0 g., 0.016 mole.
Paraformaldehyde _____ 2.0 g., 0.070 mole.
Dimethylamine hydrochloride ___ 2.5 g., 0.032 mole.

*Example 180.—4-{3-chloro-4-[2-(dimethylaminomethyl)butyryl]phenoxymethyl}benzoic acid hydrochloride*

Step A: Preparation of 4-chloromethylbenzonitrile.—p-Tolunitrile (100 g., 0.854 mole) is placed in a 3-necked flask fitted with gas inlet-outlet tube, stirrer and thermometer. The stirring is started and the nitrile is heated to 120–130° C. Chlorine gas is passed into the liquid at a moderate rate, and the reaction activated by an incandescent lamp. The addition is continued until the nitrile takes up 30 g. of the gas (about 2 hours). The material is allowed to stand overnight in air whereupon a crystalline mass forms. This is washed twice with ethanol and dried in air. Concentration of the ethanol solution to half its volume gives 73.4 g. (57%) of 4-chloromethylbenzonitrile, M.P. 75–77° C.

*Step B: Preparation of 4-chloromethylbenzoic acid.*—4-chloromethylbenzonitrile (25 g., 0.164 mole) is refluxed and stirred with concentrated hydrochloric acid (500 ml.) 14 hours. Upon cooling a solid is obtained which is removed by filtration, dried in a desiccator to give 26.6 g. (94.5%) of 4-chloromethylbenzoic acid, M.P. 202–203° C.

*Step C: Preparation of ethyl 4-chloromethylbenzoate.*—4-chloromethylbenzoic acid (26.6 g., 0.156 mole) is dissolved in absolute ethanol (225 ml.) and heated to 60° C. in a four-necked flask fitted with gas inlet tube, thermometer, stirrer, reflux condenser, and drying tube. Stirring is started, and anhydrous hydrogen chloride gas is passed in for 1 hour, the temperature being maintained at 50–60° C. The solution then is refluxed one hour, cooled and permitted to stand overnight. The ethanol then is evaporated in vacuo, the residue taken up in ether, washed with 5% sodium carbonate, dried and evaporated to an oil which distills at 91–93° C. at 0.6 mm. pressure to give 22.7 g. (74%) of ethyl-4-chloromethylbenzoate.

*Step D: Preparation of 4-{3-chloro-4-[2-(dimethylaminomethyl)butyryl]phenoxymethyl}benzoic acid hydrochloride.*—The above product is prepared following substantially the same procedures described in Example 179, Steps A through C by (a) Replacing the phenol employed in Step A by an equimolecular amount of 3-chloro-4-butyrylphenol and employing the other substances and procedure used in Example 179, Step A, to prepare the ester which then is hydrolyzed by the procedure described in Step B of Example 179 to give a 64% yield of 4-(3-chloro-4-butyrylphenoxymethyl)benzoic acid, M.P. 144–145° C., (b) The benzoic acid then is reacted with dimethylamine hydrochloride by the method described in Step C of Example 179 to give 4-{3-chloro-4-[2-dimethylaminomethyl)-butyryl]phenoxymethyl}benzoic acid hydrochloride.

*Example 181.—3-{3-chloro-4-[2-(dimethylaminomethyl)butyryl]phenoxymethyl}benzoic acid hydrochloride*

*Step A: Preparation of methyl 3-(bromomethyl)-benzoate.*—3-methylbenzoyl chloride (105.5 g., 0.68 mole) is placed in a 4 necked flask fitted with stirrer, reflux condenser, drying tube, thermometer, and dropping funnel, and heated to 180° C., stirring is started and the temperature maintained at 180° C., and bromine (110 g., 0.69 mole) is added dropwise over one hour. The mixture is then stirred an additional 1.5 hours at 180° C. and finally cooled. With stirring maintained, methanol (67 ml.) is added to the mixture dropwise over one hour. The mixture then is distilled to give the pure product which crystallizes upon standing. There is thus obtained 79 g. (50%) of methyl 3-(bromomethyl)benzoate, B.P. 136–137° C. at 8 mm. pressure.

*Step B: Preparation of 3-{3-chloro-4-[2-dimethylaminomethyl)butyryl]phenoxymethyl}benzoic acid hydrochloride.*—The above product is prepared following substantially the same procedures described in Example 179, Steps A through C, by (a) Replacing the phenol and the benzoate employed in Step A by equimolecular quantities of 3-chloro-4-butyrylphenol and methyl 3-(bromomethyl)benzoate respectively gives a 40% yield of methyl 3-(3-chloro-4-butyrylphenoxymethyl)benzoate, an oil which distills at 220–221° C., at 0.3 mm. pressure, (b) Hydrolyzing this ester by the method described in Step B of Example 176 gives a 77% yield of 3-(3-chloro-4-butyrylphenoxymethyl)benzoic acid, M.P. 132–133.5° C., and then (c) reacting the benzoic acid compound with dimethylamine hydrochloride by the procedure described in Step C of Example 179 gives 3-{3-chloro-4-[2-dimethylaminomethyl)butyryl]phenoxymethyl}-benzoic acid hydrochloride.

*Example 182.—Methyl 2-{3-chloro-4-[2-(dimethylaminomethyl)-butyryl]phenoxymethyl}benzoate hydrochloride*

*Step A: Preparation of methyl 2-(bromomethyl)benzoate.*—2-methylbenzoyl chloride (135 g., 0.845 mole) is placed in a four-necked flask fitted with stirrer, reflux condenser, drying tube, dropping funnel and thermometer, and heated to 185° C. Stirring is started and bromine (141 g., 0.882 mole) is added dropwise over 1.5 hours. The solution is stirred an additional 1 hour at 180° C. and allowed to cool. Methanol (84.5 ml.) is added dropwise over 1.5 hours and the dark solution obtained is taken up in ether and washed with saturated sodium carbonate and water and dried. The ether is evaporated in vacuo without the application of heat to give 189 g. (95%) of methyl 2-(bromomethyl)benzoate.

*Step B: Preparation of methyl 2 - {3 - chloro - 4 - [2 - (dimethylaminomethyl)butyryl]phenoxymethyl}benzoate hydrochloride.*—The above product is prepared following substantially the same procedures described in Example 179, Steps A and C, by (a) Replacing the phenol and the benzoate employed in Step A by equimolecular amounts of 3-chloro-4-butyrylphenol and methyl 2-(bromomethyl)benzoate respectively to give a 75% yield of methyl 2-(3-chloro-4-butyrylphenoxymethyl)benzoate, M.P. 82–83° C., and (b) Reacting the ester with dimethylamine hydrochloride by the method described in Example 179, Step C, to give methyl 2 - {3 - chloro - 4 - [2 - (dimethylaminomethyl)butyryl]phenoxymethyl}-benzoate hydrochloride.

*Example 183.—4-{3-chloro-4-[2-(dimethylaminomethyl)butyryl]phenoxy}benzoic acid hydrochloride*

*Step A: Preparation of 4'-(3-chlorophenoxy)acetophenone.*—3-chlorophenol (16.2 g., 0.125 mole) and solid potassium hydroxide (8.3 g., 0.125 mole) are combined and heated to 150° C. under aspirator vacuum for 2 hours. 4-bromoacetophenone (25 g., 0.125 mole) and copper powder (0.2 g., as catalyst) are added and the mixture heated to 190–200° C. for three hours. After cooling the reaction mixture is extracted with a mixture of ether and 5% sodium hydroxide. The ether layer is separated, washed with 5% sodium hydroxide and water, dried and evaporated to an oil. The oil is distilled at 150–165° C. at 0.5 mm. pressure and the product obtained redistilled at 162–164° C. at 2 mm. pressure to give 9 g. (29%) of 4'-(3-chlorophenoxy)acetophenone which in the form of its semicarbazone melts at 165–166.5° C.

*Step B: Preparation of 4-(3-chlorophenoxy)benzoic acid.*—4'-(3-chlorophenoxy)acetophenone (5 g., 0.020 mole) is suspended in a solution of potassium permanganate (9.75 g., 0.062 mole) in 10% sodium hydroxide (40 ml.) and heated on the steam bath with stirring for three hours. The acetophenone dissolves and manganese dioxide precipitates. The excess permanganate is reduced with 30% hydrogen peroxide and the manganese dioxide removed by filtration. The clear solution obtained is acidified with concentrated hydrochloric acid to give a white solid, which after recrystallization from a mixture of ethanol and water yields 4 g. (80%) of 4-(3-chlorophenoxy)benzoic acid, M.P. 135–136° C.

*Analysis.*—Calculated for $C_{13}H_9O_3Cl$: C, 62.79; H, 3.65. Found: C, 62.65; H, 3.79.

*Step C: Preparation of methyl 4-(3-chlorophenoxy)benzoate.*—4-(3-chlorophenoxy)benzoic acid (16 g., 0.065 mole) is refluxed in anhydrous methanol (100 ml.) with a trace of dry hydrogen chloride for 24 hours. The volume of methanol is reduced to about 25 ml. and water (100 ml.) added. The mixture is extracted with ether and washed with saturated sodium bicarbonate and water, dried and evaporated to an oil. The oil is distilled to give a product boiling at 159–162° C. at 0.1 mm. pressure yielding 14 g. (84%) of methyl 4-(3-chlorophenoxy)benzoate.

*Step D: Preparation of methyl 4(3-chloro-4-butyrylphenoxy)benzoate.*—Methyl 4-(3-chlorophenoxy)benzoate (20 g., 0.076 mole) and butyryl chloride (8.6 g., 0.080 mole) are mixed in a 3-necked, round-bottomed flask fitted with a stirrer, reflux condenser and drying tube, and a Gooch addition tube in which aluminum chloride (32 g., 0.250 mole) has previously been placed. Vigorous stirring is started and the mixture warmed gently on the steam bath. The aluminum chloride is added slowly in small portions over one-half hour. With stirring maintained, the mixture is heated on the steam bath for three hours and then allowed to cool with continued stirring. Chipped ice (300 g.) is added, followed by hydrochloric acid (10%, 150 ml.) which is added dropwise over one-half hour while the mixture is again heated on the steam bath. The mixture then is extracted with ether, washed with 5% sodium hydroxide and water, dried and evaporated to an oil which distilled at 198–202° C. at 0.3 mm. pressure to give 13 g. (52%) of methyl 4(3-chloro-4-butyrylphenoxy)benzoate.

*Step E: Preparation of 4-{3-chloro-4-[2-(dimethylaminomethyl)butyryl]phenoxy}benzoic acid hydrochloride.*—The above product is made by substantially the same procedure described in Example 179, Steps B and C by (a) Hydrolyzing the above obtained benzoate by the method described in Step B of Example 179 to give a 61% yield of 4-(3-chloro-4-butyrylphenoxy)benzoic acid, M.P. 122–123° C. and then (b) Reacting this benzoic acid with dimethylamine hydrochloride by the procedure described in Step C of Example 179 to give 4-{3-chloro-4-[2-(dimethylaminomethyl)butyryl]phenoxy}benzoic acid hydrochloride.

*Example 184.—2-{3-chloro-4-[2-(dimethylaminomethyl)-butyryl]phenoxy}benzoic acid hydrochloride*

*Step A: Preparation of methyl 2-(3-chlorophenoxy)-benzoate.*—m-Chlorophenol (64 g., 0.50 mole), o-bromobenzoic acid (50 g., 0.25 mole), potassium hydroxide (28 g., 0.50 mole), and copper metal (15 g.) are mixed and heated on a steam bath under aspirator vacuum for 5 hours. The mixture is taken up in 5% sodium hydroxide, filtered and acidified. The oil which forms is taken up in ether and extracted into saturated sodium bicarbonate and acidified to give an oil. The oil is taken up into ether, dried and evaporated. The remaining oil is dissolved in absolute methanol (200 ml.) and dry hydrogen chloride gas is bubbled through it for one minute. The solution then is refluxed 18 hours and the volume of solvent then reduced to about 100 ml. Water (300 ml.) is added and the mixture then extracted with ether, washed with 5% sodium carbonate and water, dried and evaporated to an oil. The oil is distilled and the fraction boiling at 130–140° C., at 0.5 mm. pressure gives 29.5 g. (45%) of methyl 2-(3-chlorophenoxy)benzoate.

*Step B: Preparation of methyl 2-(3-chloro-4-butyrylphenoxy)benzoate.*—Methyl 2-(3-chlorophenoxy)benzoate (19 g., 0.073 mole) and butyryl chloride (7.7 g., 0.073 mole) are placed in a 3-necked flask fitted with stirrer, drying tube and Gooch addition tube. Stirring is started and the mixture warmed on a steam bath while aluminum chloride (29 g., 0.22 mole) is added in small portions over one-half hour through the Gooch tube. The mixture is stirred and heated on a steam bath 24 hours, cooled and 100 g. of ice and concentrated hydrochloric acid (100 ml.) added. The mixture is heated for an additional one-half hour on the steam bath and then cooled. An oil separates and is taken up in ether, washed with saturated sodium bicarbonate and water and dried and evaporated to an oil which distills at 176–180° C. at 0.2 mm. pressure to give 6.2 g. (26%) of methyl 2-(3-chloro-4-butyrylphenoxy)benzoate.

*Step C: Preparation of 2-{3-chloro-4-[2-(dimethylaminomethyl)butyryl]phenoxy}benzoic acid hydrochloride.*—This product is prepared following substantially the same procedures described in Example 179, Steps B and C, by (a) Hydrolyzing the methyl 2-(3-chloro-4-butyrylphenoxy)benzoate by the method described in Step B of Example 179, to give a 70% yield of 2-(3-chloro-4-butyrylphenoxy)benzoic acid, which then (b) Is reacted with dimethylamine hydrochloride by the method described in Step C of Example 179 to give 2-{3-chloro - 4-[2-(dimethylaminomethyl)butyryl]phenoxy}benzoic acid hydrochloride.

It will be appreciated that the dosage of the novel compounds of this invention will vary over a wide range depending upon the age and weight of the patient to be treated, upon the particular ailment to be treated, and the relative potency of the selected diuretic agent. The total daily dose would be within the range of 25-2000 mg. administered in divided doses throughout the day. For this purpose tablets, pills, capsules, and the like containing, for example, 25 to 500 mg. of active ingredient can be made available for the symptomatic adjustment of the dosage to the individual patient. These dosages appear to be well below the toxic dose of the compounds of this invention.

As each of the compounds of this invention can be incorporated in a dosage form similar to that described in the following examples, or in other dosage forms suitable for oral or parenteral administration which can be prepared by well-known methods, only a few examples are included herein to illustrate the preparation of representative dosage forms.

*Example 185.—Dry-filled capsules containing 50 mg. of active ingredient per capsule*

| | Mg. per capsule |
|---|---|
| 3-chloro-4-[2 - (dimethylaminomethyl)butyryl]phenoxyacetic acid hydrochloride (from Example 96) | 50 |
| Lactose | 174 |
| Magnesium stearate | 1 |
| | 225 |

Capsule size No. 2.

The 3-chloro-4-[2-(dimethylaminomethyl)butyryl]phenoxyacetic acid hydrochloride is reduced to a No. 60 powder, lactose and the magnesium stearate then are passed through a No. 60 bolting cloth onto the powder and the combined ingredients are admixed for 10 minutes and then filled into No. 2 dry gelatin capsules.

Similar dry-filled capsules can be prepared by replacing the active ingredient of the above example by any of the other novel compounds of this invention.

*Example 186.—Parenteral composition containing 10 mg. of active ingredient per ml. of composition*

| | Per ml. |
|---|---|
| 2,3-dichloro-4-[2 - (1 - piperidylmethyl)butryl]phenoxyacetic acid hydrochlorides,* mg. | 10.0 |
| Polysorbate 80, mg. | 1.0 |
| Sodium citrate, mg. | 1.0 |
| Benzyl alcohol, mg. | 9.0 |
| Sorbitol solution U.S.P., ml. | 0.5 |
| Water-for-injection to make, ml. | 1.0 |

*May be varied without affecting general procedure.

DIRECTIONS FOR MAKING 100 ML. OF COMPOSITION

Polysorbate 80 (polyoxyethylene sorbitan mono-oleate), sodium citrate and benzyl alcohol are dissolved in approximately 40 ml. of water-for-injection, and then 2,3-dichloro-4-[2 - (1 - piperidylmethyl)butyryl]phenoxyacetic acid hydrochloride and an amount of glass beads (3–6 mm. diameter) equal to about ½ the volume of liquid are added. The mixture is poured into a vial, stoppered and placed on a roller mill for 24–48 hours. After removing the material from the roller mill, the suspension is poured through a Büchner funnel to remove the beads, and the beads then are rinsed with sufficient water to bring the volume of filtrate to 50 ml. The sorbitol solution then is added and thoroughly mixed with the filtrate.

While the above examples describe the preparation of certain compounds which are illustrative of the novel compounds of this invention, and certain specific dosage forms suitable for administering the novel compounds, it is to be understood that the invention is not to be limited to the specific compounds described in the examples or by the specific reaction conditions described for the preparation of these compounds or by the specific ingredients included in the pharmaceutical preparations, but is to be understood to embrace variations and modifications thereof which fall within the scope of the appended claims.

What is claimed is:

1. A pharmaceutically acceptable acid addition salt of a compound having the structural formula

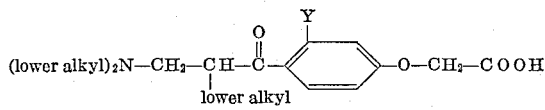

wherein Y is halogen.

2. A pharmaceutically acceptable acid addition salt of 3-chloro-4-[2-(dimethylaminomethyl)propionyl]phenoxyacetic acid.

3. A pharmaceutically acceptable acid addition salt of 3-chloro-4-[3-(dimethylamino)propionyl]phenoxyacetic acid.

4. A pharmaceutically acceptable acid addition salt of 3-chloro-4-[2-(dimethylaminomethyl)butyryl]phenoxyacetic acid.

5. A pharmaceutically acceptable acid addition salt of a compound having the structural formula

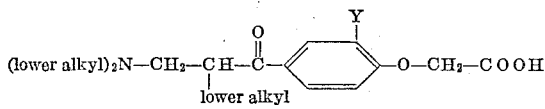

wherein Y is a halogen.

6. A pharmaceutically acceptable acid addition salt of a compound having the structural formula

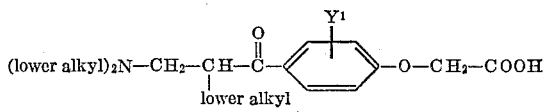

wherein $Y^1$ is lower aliphatic.

7. A pharmaceutically acceptable acid addition salt of a compound having the structural formula

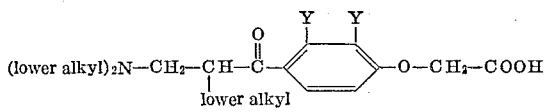

wherein Y is halogen.

8. A pharmaceutically acceptable acid addition salt of a 2,3-dichloro-4-[2-(dimethylaminomethyl)butyryl]phenoxyacetic acid.

9. Hydrochloride salt of 2,3-dichloro-4-[2-(dimethylaminomethyl)butyryl]phenoxyacetic acid.

10. A pharmaceutically acceptable acid addition salt of a compound having the structural formula

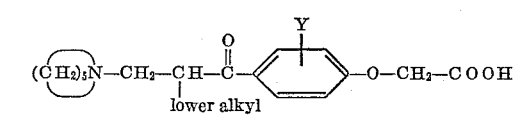

wherein Y is halogen.

11. A pharmaceutically acceptable acid addition salt of a compound having the structural formula

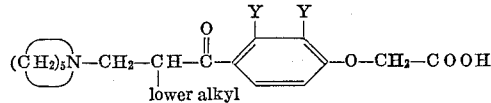

wherein Y is halogen.

12. A pharmaceutically acceptable acid addition salt of 2,3-dichloro-4-[2-(1-piperidylmethyl)butyryl]-phenoxyacetic acid.

13. Hydrochloride salt of 2,3-dichloro-4-[2-(1-piperidylmethyl)butyryl]phenoxyacetic acid.

14. A pharmaceutically acceptable acid addition salt of a compound having the structural formula

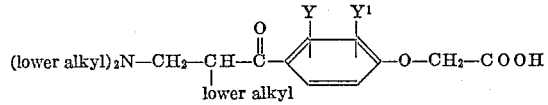

wherein Y is halogen and $Y^1$ is lower alkyl.

15. A pharmaceutically acceptable acid addition salt of a compound having the structural formula

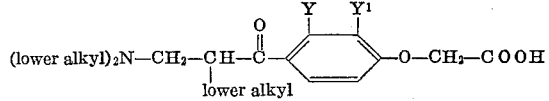

wherein Y is halogen and $Y^1$ is lower alkyl.

16. A pharmaceutically acceptable acid addition salt of 2-methyl-3-chloro-4-[2-(dimethylaminomethyl)-butyryl]phenoxyacetic acid.

17. A pharmaceutically acceptable acid addition salt of a compound having the structural formula

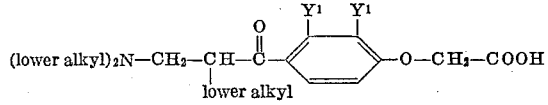

wherein $Y^1$ is lower alkyl.

18. A pharmaceutically acceptable acid addition salt of 2,3-dimethyl-4-[2-(dimethylaminomethyl)butyryl]phenoxyacetic acid.

19. Hydrochloride salt of 2,3-dimethyl-4-[2-(dimethylaminomethyl)butyryl)phenoxyacetic acid.

20. A pharmaceutically acceptable acid addition salt of a compound having the structural formula

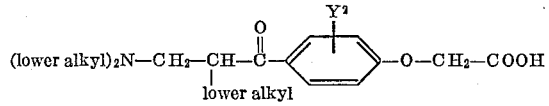

wherein $Y^2$ is lower alkoxy.

21. A pharmaceutically acceptable acid addition salt of a compound having the structural formula

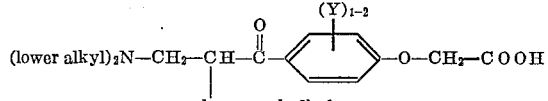

wherein Y is halogen.

22. A pharmaceutically acceptable acid addition salt of a compound having the structural formula

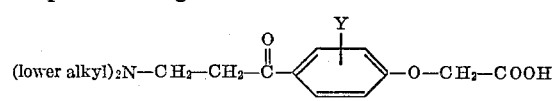

wherein Y is halogen.

23. A pharmaceutically acceptable acid addition salt of a compound having the structural formula

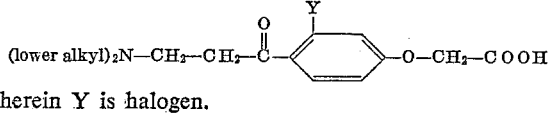

wherein Y is halogen.

24. A pharmaceutically acceptable acid addition salt of a compound having the structural formula

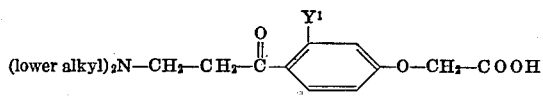

wherein $Y^1$ is lower alkyl.

25. A pharmaceutically acceptable acid addition salt of 3-methyl-4 - [3 - (dimethylamino)propionyl)phenoxyacetic acid.

26. A member selected from the group consisting of a compound having the formula:

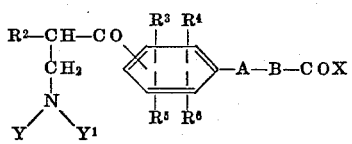

and the pharmaceutically acceptable acid addition salts thereof, wherein A is a member selected from the group consisting of oxygen and sulfur; B is a member selected from the group consisting of lower alkylene, mononuclear carbocyclic arylene and mononuclear carbocyclic alkarylene; $R^2$ is a member selected from the group consisting of hydrogen, halogen, lower alkyl, cycloalkyl, mononuclear carbocyclic aryl and mononuclear carbocyclic aralkyl; $R^3$, $R^4$, $R^5$ and $R^6$ are similar and dissimilar members selected from the group consisting of hydrogen, halogen, lower alkyl, lower alkoxy, nitro, amino and, taken together with the ring carbon atoms to which they are attached, the $R^3$ and $R^4$ radicals may be joined to form an alkylene chain having from three to four carbon atoms between their points of attachment to the benzene ring; and Y and $Y^1$ are similar and dissimilar lower alkyl radicals or, together with the nitrogen atom to which they are attached, an heterocyclic moiety selected from the group consisting of pyrrolidino, piperidino, morpholino and piperazino; X is selected from the group consisting of hydroxyl, alkoxy, amino, and hydrazino; and the carboxylic group is selected from the meta and para positions with respect to the aminoacyl group.

27. A pharmaceutically acceptable acid addition salt of a compound having the structural formula

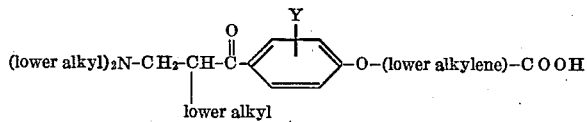

wherein Y is halogen.

28. A pharmaceutically acceptable acid addition salt of a compound having the structural formula

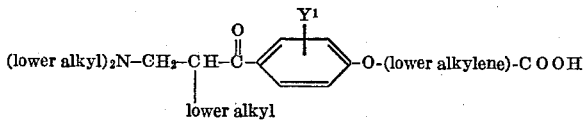

wherein $Y^1$ is lower alkyl.

29. A pharmaceutically acceptable acid addition salt of a compound having the structural formula

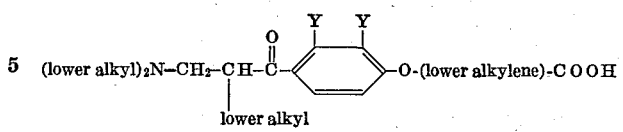

wherein Y is halogen.

30. A pharmaceutically acceptable acid addition salt of a compound having the structural formula

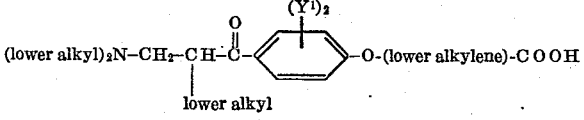

wherein $Y^1$ is lower alkyl.

31. A pharmaceutically acceptable acid addition salt of a compound having the structural formula

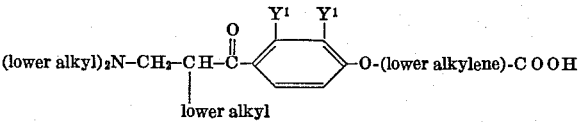

wherein $Y^1$ is lower alkyl.

32. A pharmaceutically acceptable acid addition salt of a compound having the structural formula

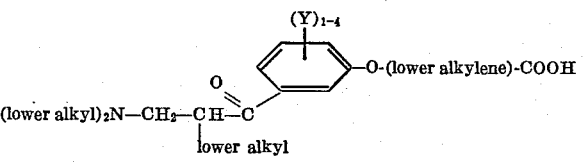

wherein Y is halogen.

33. A pharmaceutically acceptable acid addition salt of a compound having the structural formula

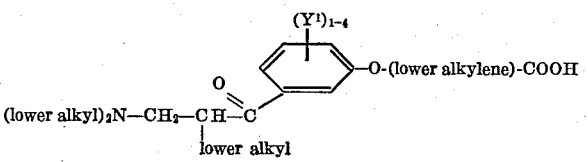

wherein $Y^1$ is lower alkyl.

34. A pharmaceutically acceptable acid addition salt of a compound having the structural formula

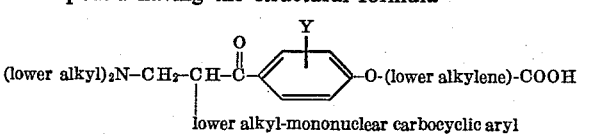

wherein Y is halogen.

References Cited by the Examiner

Bergel et al., "J. Chem. Soc.," 1944, pages 261–5.

NICHOLAS S. RIZZO, *Primary Examiner.*